United States Patent [19]

Miller

[11] Patent Number: 4,688,664
[45] Date of Patent: Aug. 25, 1987

[54] CLUTCH AND BRAKE APPARATUS

[76] Inventor: George F. Miller, Rte. 2, Coleman Rd., Franklin, Tenn. 37064

[21] Appl. No.: 782,967

[22] Filed: Oct. 1, 1985

Related U.S. Application Data

[60] Division of Ser. No. 661,277, Oct. 16, 1984, Pat. No. 4,567,788, which is a continuation of Ser. No. 380,416, Oct. 20, 1982, abandoned.

[51] Int. Cl.$^4$ .............................................. F16D 67/04
[52] U.S. Cl. ................................. 192/18 A; 192/12 C; 192/91 R
[58] Field of Search ............... 74/781 R, 782, 783, 74/411.5, 740, 789, 785; 192/18 A, 12 C, 91 R, 85 C, 85 CA

[56] References Cited

U.S. PATENT DOCUMENTS

| | | | |
|---|---|---|---|
| 2,210,239 | 8/1940 | Hale | 74/260 |
| 2,507,050 | 5/1950 | Roberts | 74/781 |
| 2,578,308 | 11/1951 | Iavelli | 192/85 CA X |
| 2,870,655 | 1/1959 | Rockwell | 74/785 |
| 2,918,832 | 12/1959 | Meyers | 74/785 |
| 3,011,608 | 12/1961 | Hansen | 192/85 CA |
| 3,020,990 | 2/1962 | Liu | 192/4 |
| 3,148,144 | 9/1964 | Brenner et al. | 192/85 CA |
| 3,157,257 | 11/1954 | Root | 192/85 CA X |
| 3,228,261 | 1/1966 | Puls et al. | 74/770 |
| 3,444,971 | 5/1969 | Davidson | 192/85 CA |
| 3,448,828 | 6/1969 | Goldberg | 184/6 |
| 3,487,726 | 1/1970 | Burnett | 74/781 |
| 3,638,773 | 2/1972 | Lewis | 192/18 A |
| 3,954,028 | 5/1976 | Windish | 74/792 |
| 4,051,933 | 10/1977 | Beneke et al. | 192/85 CA X |
| 4,178,814 | 12/1979 | Ahlen | 74/781 R |
| 4,183,425 | 1/1980 | Sommer | 192/113 |
| 4,238,017 | 12/1980 | Spokas | 192/85 CA X |
| 4,267,911 | 5/1981 | Cory | 192/18 |
| 4,290,322 | 9/1981 | Huitema | 74/752 A |
| 4,402,224 | 9/1983 | Fukushima | 73/705 |
| 4,423,751 | 1/1984 | Roettgen | 137/557 |

FOREIGN PATENT DOCUMENTS 696122 10/1964 Canada .............................. 74/781 R Primary Examiner—Rodney M. Bonck
Assistant Examiner—Richard M. Lorence
Attorney, Agent, or Firm—Luedeka & Neely

[57] ABSTRACT

A clutch and brake apparatus for being mounted in a housing comprises first clutch having an annular shape and second clutch functioning as a brake adjacent the first clutch, the second clutch having an annular shape and being concentrically disposed with the first clutch. A pressure plate is mounted for non-rotating movement toward and away from the first and second clutches for selectively engaging at least one of the first and second clutches and for holding the pressure plate in a rotationally stationary position with respect to the housing and second clutch. Structure is provided for urging the pressure plate toward both the first and second clutches and is operable to engage the first clutch. Roller bearings are interposed between the first clutch and the pressure plate to permit relative movement between the pressure plate and the first clutch. The first clutch is operable to rotate relative the pressure plate when force is applied by the pressure plate through the roller bearings and an annular piston is provided for moving toward the second clutch to selectively compress and engage the second clutch and selectively move the pressure plate away from the first clutch to disengage the first clutch.

3 Claims, 19 Drawing Figures

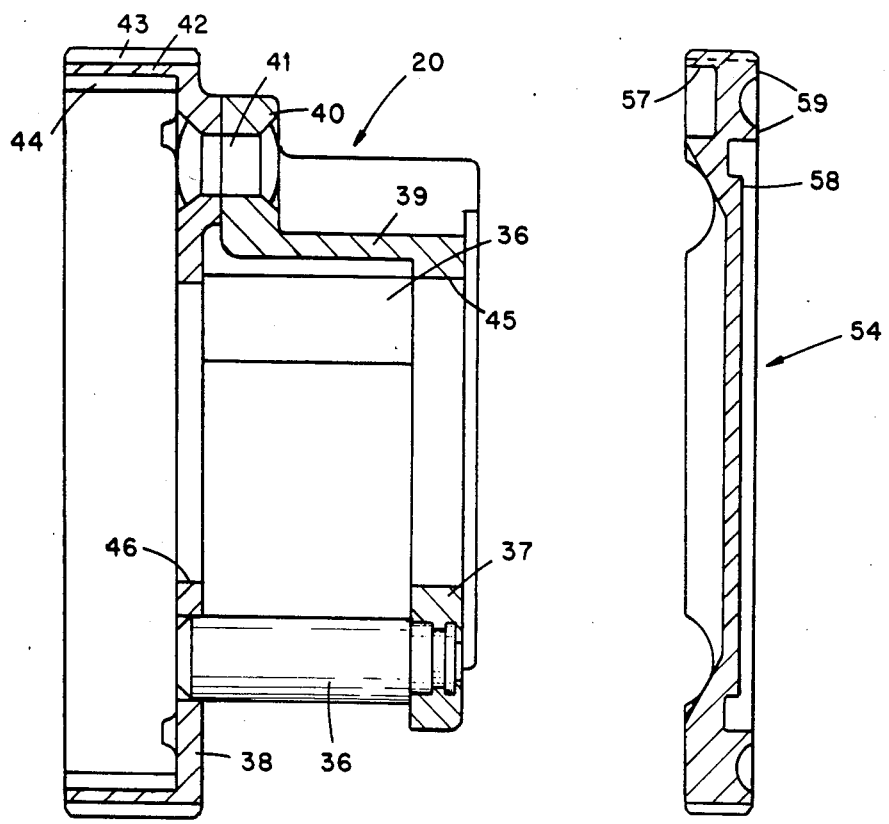
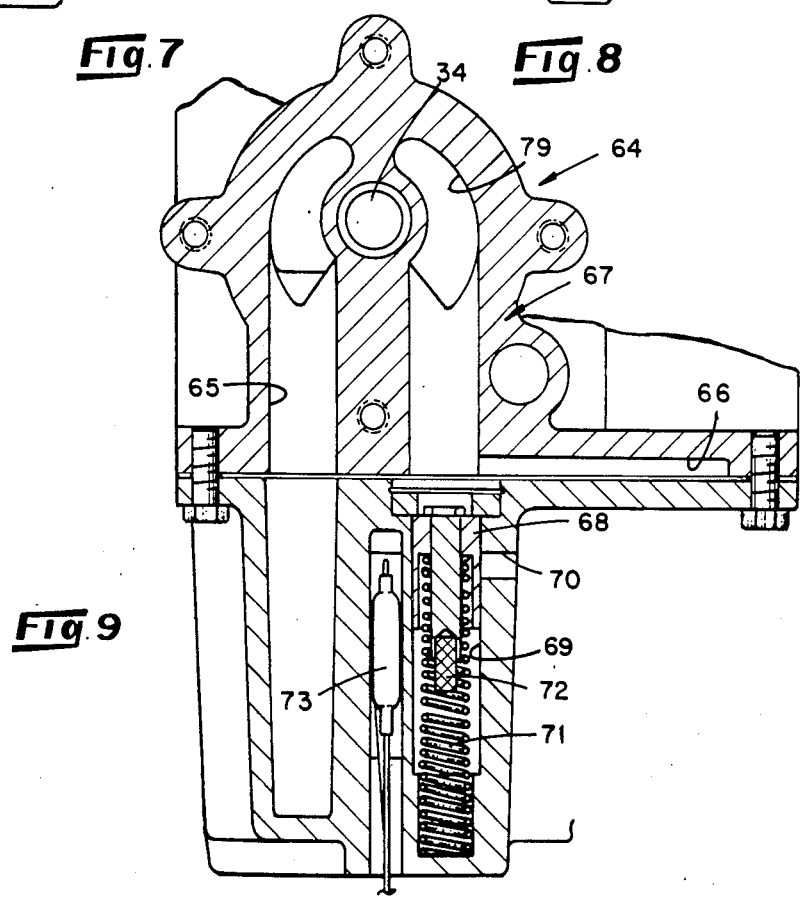

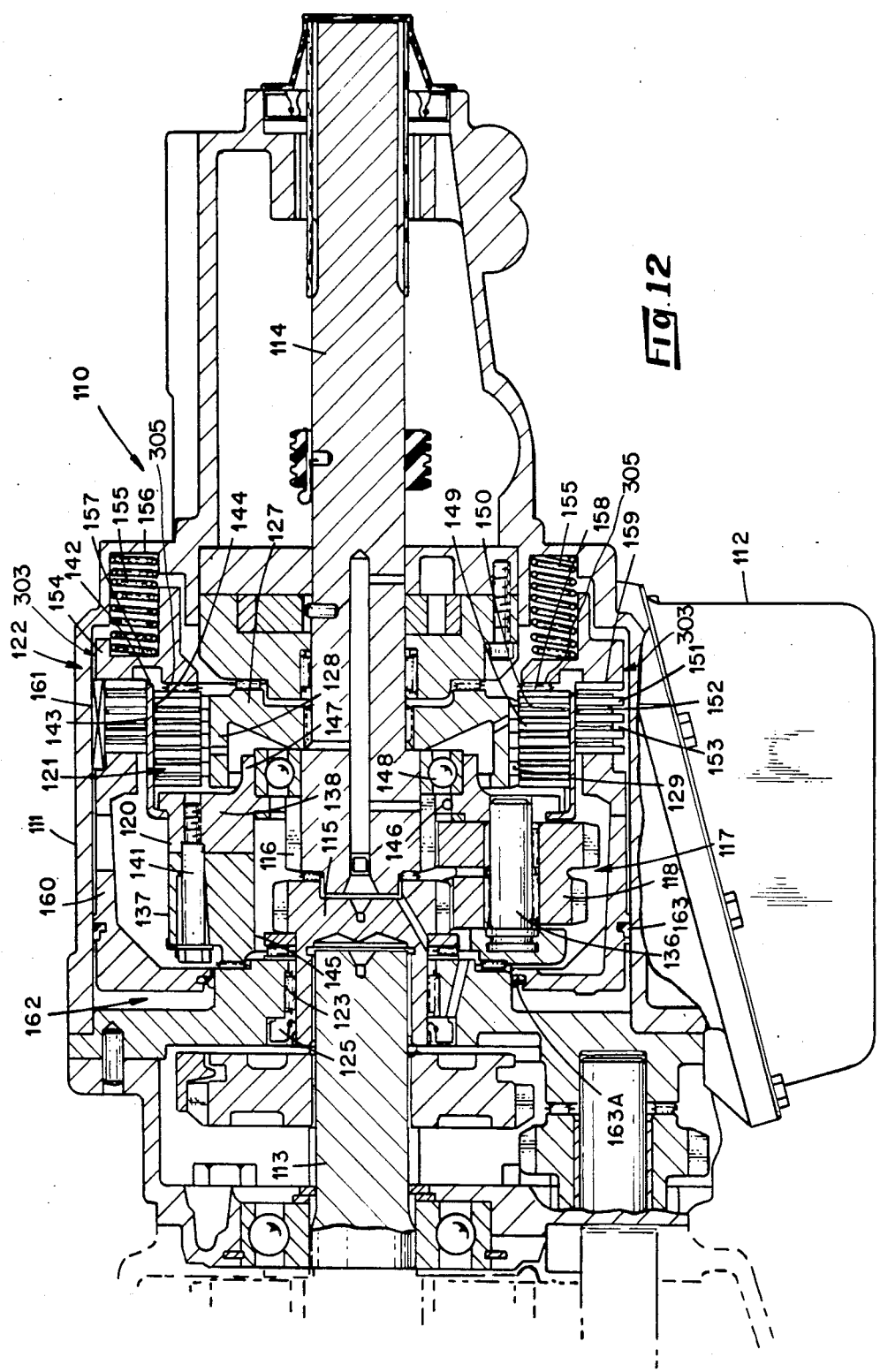

CLUTCH AND BRAKE APPARATUS

This application is a divisional of U.S. patent application Ser. No. 661,277 filed Oct. 16, 1984, now U.S. Pat. No. 4,567,788, which is a continuation of U.S. patent application Ser. No. 380,416 filed May 20, 1982, now abandoned.

The present invention relates generally to transmissions for use in motor vehicles and more particularly to an overdrive transmission unit for motor vehicles.

Oil and petroleum fuels are becoming increasingly scarce and expensive. Consequently, it is becoming more important than ever before in operating a motor vehicle to obtain a maximum number of travel miles per gallon of fuel consumed.

Overdrive transmissions have been used for a number of years as a means for increasing the miles of travel per gallon of gasoline consumed. A typical overdrive transmission uses a planetary gear train with three planetary pinions driven around a stationary sun gear. The planetary gear train is driven by a surrounding internal gear which is coupled to a propeller or output shaft which is turned faster than the input shaft.

Overdrive transmissions generally are designed as a part of the primary transmission of a motor vehicle and, therefore, are considered as original equipment in a motor vehicle. If a person with a motor vehicle without an overdrive decided that such a feature was beneficial, the only alternative was to change the entire transmission. This, of course, could be so expensive as to make the benefits of an overdrive feature prohibitively expensive.

Four-wheel drive vehicles have become very popular in the last few years. However, typically four-wheel drive vehicles have a relatively high fuel consumption, even when in two wheel drive. As a result, the market for four-wheel drive vehicles has diminished and useage of those already existing has decreased substantially. An overdrive for this type of vehicle would have obvious benefits.

In addition, heretofore known overdrive transmissions generally have been free-wheeling, that is, not providing engine braking of the vehicle when the driver lifts his foot from the throttle. As a result, the braking ability of the vehicle is impaired. Also, free-wheeling can be particularly bothersome when going down a hill. Thus, each time a driver needs to slow-up even slightly, or maintain a constant speed downhill, he must apply the vehicle brakes. This procedure causes increased brake wear, and can be dangerous as the drivers behind may think that he is braking to a stop and not merely slowing down somewhat.

An object of the present invention is to provide an improved overdrive of the class described.

Another object of the present invention is to provide an overdrive transmission which is adapted to be retrofited to motor vehicles already in service without having to replace or modify the existing transmission of the motor vehicle.

A further object of the present invention is to provide an overdrive transmission as a conversion kit which is compact and can be readily installed between the existing transfer case and existing differential of a four-wheel drive motor vehicle.

A still further object of the present invention is to provide an overdrive transmission which allows for engine braking.

Yet another object of the present invention is to provide a clutch apparatus having two clutches wherein when one clutch engages the other clutch concurrently disengages.

Yet a further object of the present invention is to provide a clutch apparatus having two clutches wherein there is neutral mode between the disengagement of one clutch and the engagement of the other clutch.

Other objects and advantages of the invention will become known by reference to the following description and drawings in which:

FIG. 7 is a cross-sectional view of a planet gear carrier;

FIG. 8 is a cross-sectional view of a clutch pressure plate;

FIG. 9 is a cross-sectional view taken along line 9—9 in FIG. 1;

FIG. 12 is a cross-sectional side view of another advantageous embodiment of an overdrive transmission embodying various features of the present invention in the overdrive mode;

Figure 1:
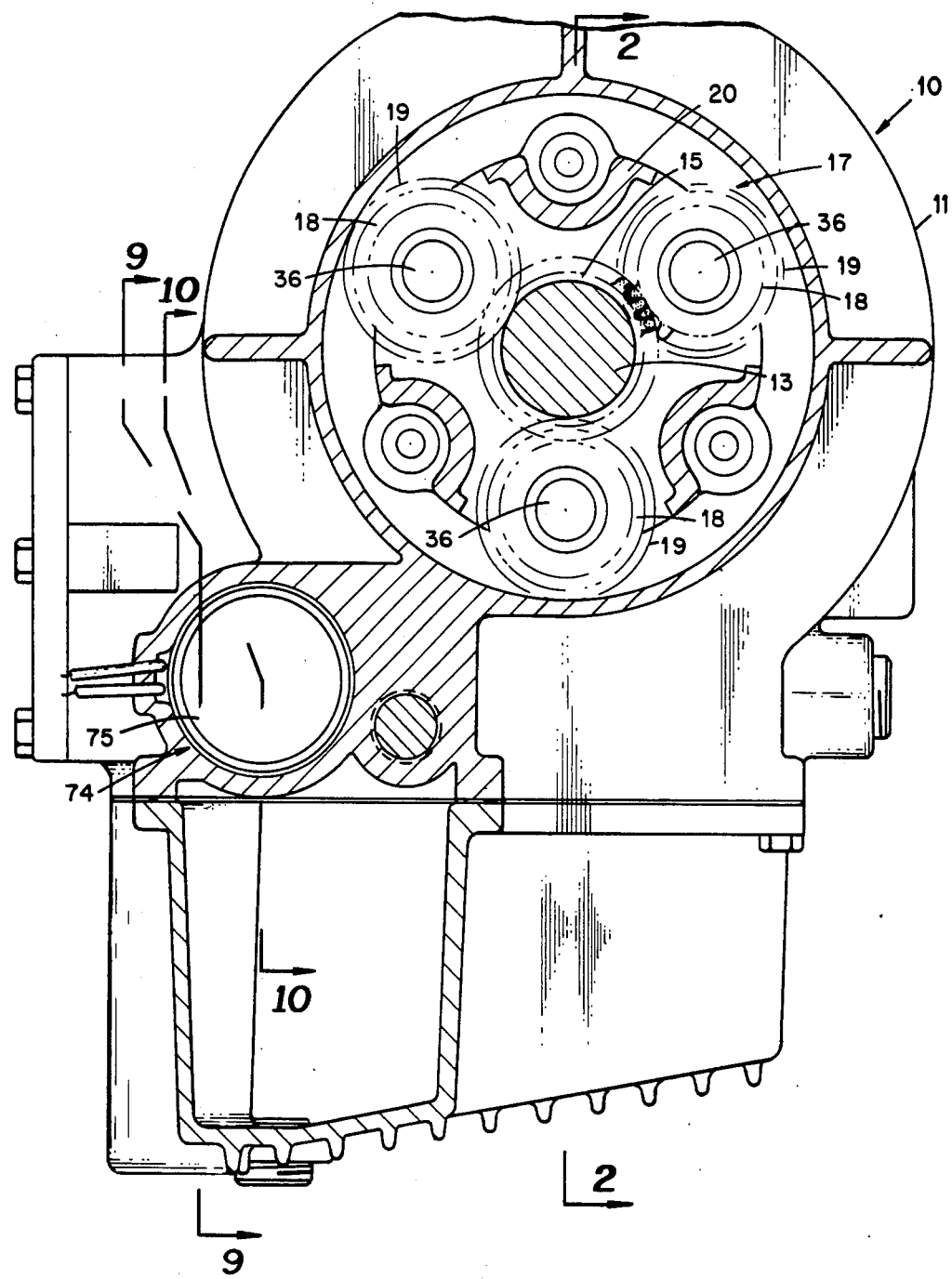
FIG. 1 is a front cross-sectional view of an overdrive transmission embodying various of the features of the invention.

The illustrated embodiments, in general, provide an overdrive transmission device for use in a motor vehicle comprising a housing with a driving shaft projecting from one end and a driven shaft projecting from the other end of the housing. A driving sun gear is coaxially mounted to the driving shaft for rotation therewith. A driven sun gear is coaxially mounted with the driving sun gear for rotation about the common axis and is drivingly connected to the driven shaft. A planetary gear train is used to selectively couple the driving shaft to the driven shaft and includes a first and a second set of planet gears attached to a common planet gear carrier. The first set of planet gears is in mesh with the driving sun gear and the second set of planet gears is in mesh with the driven sun gear. A first clutch is used to selectively couple and uncouple the planet gear carrier to the driven shaft, and a second clutch is used to selectively couple and uncouple the planet gear carrier to the transmission housing. The first and second clutches are activated concurrently so that when the first clutch is activated coupling the planet gear carrier to the driven shaft the second clutch is de-activated, uncoupling the planet gear carrier from the transmission housing. When the first clutch is de-activated, uncoupling the planet gear carrier from the driven shaft, the second clutch is activated to couple the planet gear carrier to the transmission housing. The clutches include a spring biased pressure plate and a plurality of alternating clutch discs and clutch plates.

A fluid acuated piston is used to activate and deactivate the clutches. The piston preferably utilizes transmission lubricating oil as the working fluid. In one advantageous embodiment, an oil pump is used to circulate lubricating oil from the oil sump into the transmission housing and is also in selective fluid communication with the piston in the overdrive transmission. A solenoid activated valve is disposed in the line of fluid communication between the oil pump and piston to selectively close or open the line of fluid communication. When the volume rate of flow of oil from the oil pump increases to a predetermined value in response to increased vehicle engine speed, the electric solenoid is energized and opens the line of fluid communication between the oil pump and the piston. The piston moves to activate the second clutch and concurrently de-activate the first clutch to shift the overdrive transmission into the overdrive mode. When the volume rate of flow of oil from the oil pump decreases below the predetermined value as a result of decreased vehicle engine speed, the solenoid is de-energized and closes the fluid line of communication between the oil pump and the piston. The piston then moves to de-activate the second clutch and concurrently activate the first clutch to shift the transmission from the overdrive mode into a direct drive mode.

FIGS. 1, 2, 3 and 4 show an overdrive transmission device 10 for use in motor vehicle. The overdrive transmission device 10 is used to allow decreased engine speed at a given road speed, and is coupled between main vehicle transmission, or transfer case of, for example, a four-wheel drive vehicle, and the propeller shaft of the motor vehicle.

The overdrive transmission includes a housing 11 having an oil sump 12 in fluid communication with the housing 11. A driving shaft 13 is rotatably mounted in the housing 11 and projects from one end thereof. A driven shaft 14 is rotatably mounted in the housing 11 and projects from the opposite end of the housing 11. As illustrated, the driven shaft 14 is coaxial with the driving shaft 13.

A driving, or first sun gear 15 is concentrically disposed with the driving shaft 13 and is attached thereto for rotation therewith. A driven, or second sun gear 16 is coaxially located relative to the first sun gear 15 and mounted in the housing 11 for rotation about a common axis with the driving sun gear 15. The driven sun gear 16 is drivingly connected to the driven shaft 14.

Figure 5:
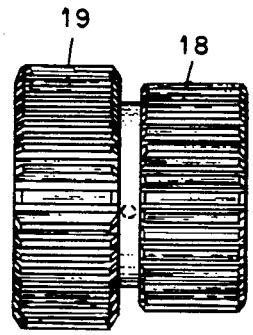
FIG. 5 is a side view of a planet gear.

A planetary gear train 17 couples the driving shaft 13 to the driven shaft 14. The planetary gear train 17 includes a first set of planetary gears 18 and a second set of planetary gears 19 mounted on a common planet gear carrier 20. The first set of planet gears 18 are each in constant mesh with the driving sun gear 15 and the second set of planet gears 19 are each in constant mesh with the driven sun gear 16. Each of the planetary gears making up sets 18 and 19 are a common unit as illustrated in FIG. 5 but are of different diameters as illustrated.

A first clutch means 21 is used to selectively couple and uncouple the planet gear carrier 20 to the driven shaft 14 through the driven sun gear 16, and a second clutch means 22 is used to concurrently selectively uncouple and couple the planet carrier 20 to the gear housing 11 fixing it against rotation.

The driving shaft 13 is mounted in the gear housing 11 by means of a front bearing 23 located at the end of the driving shaft 13 where it protrudes from the front of housing 11, and a rear bearing 24 at the other end of the driving shaft 13 near the rear of the housing. An O-ring seal 25 seals against oil leakage between the front bearing 23 and the driving shaft 13.

Figure 2:
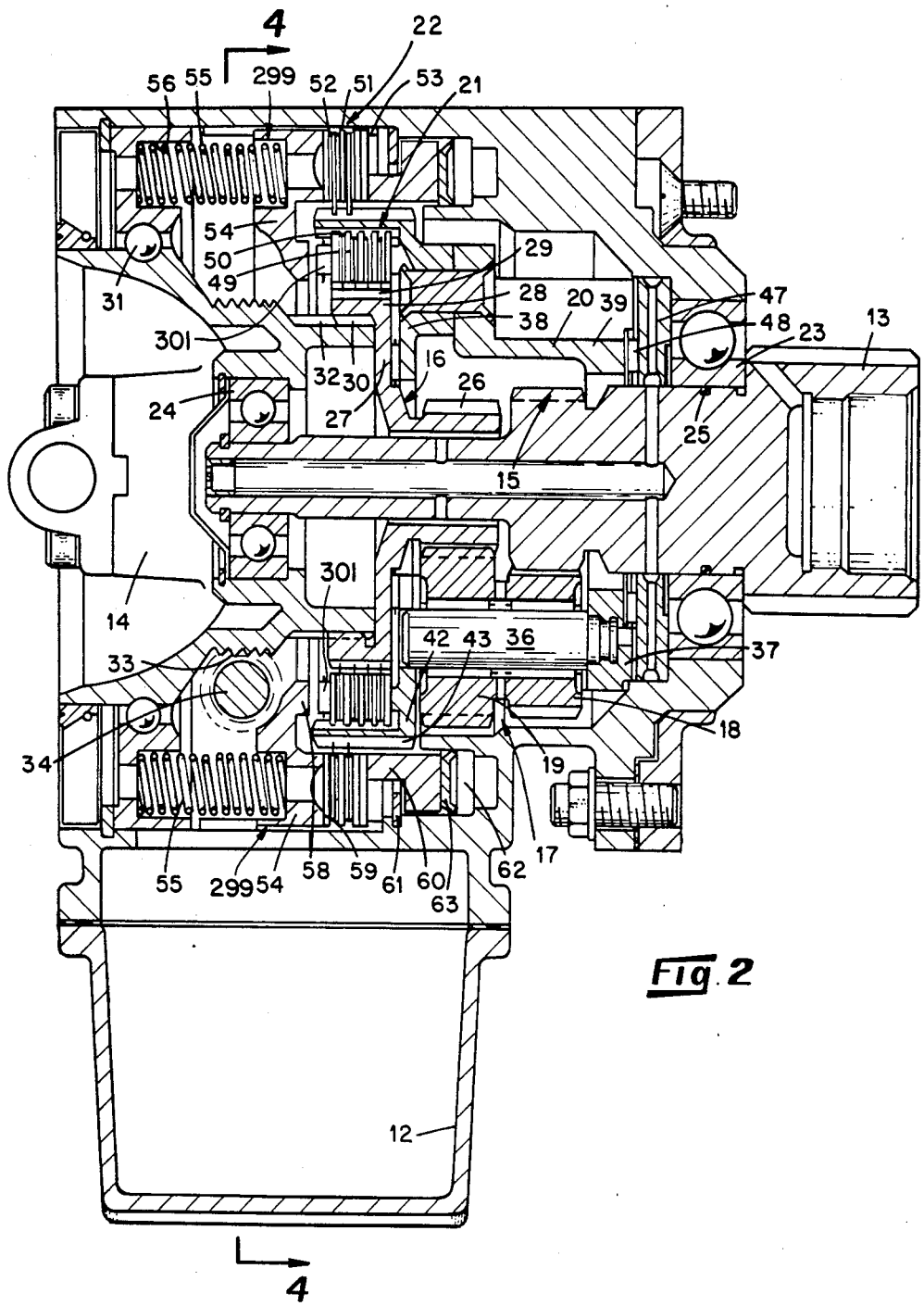
FIG. 2 is a cross-sectional side view taken along line 2—2 in FIG. 1 with the transmission in the overdrive mode.
Figure 3:
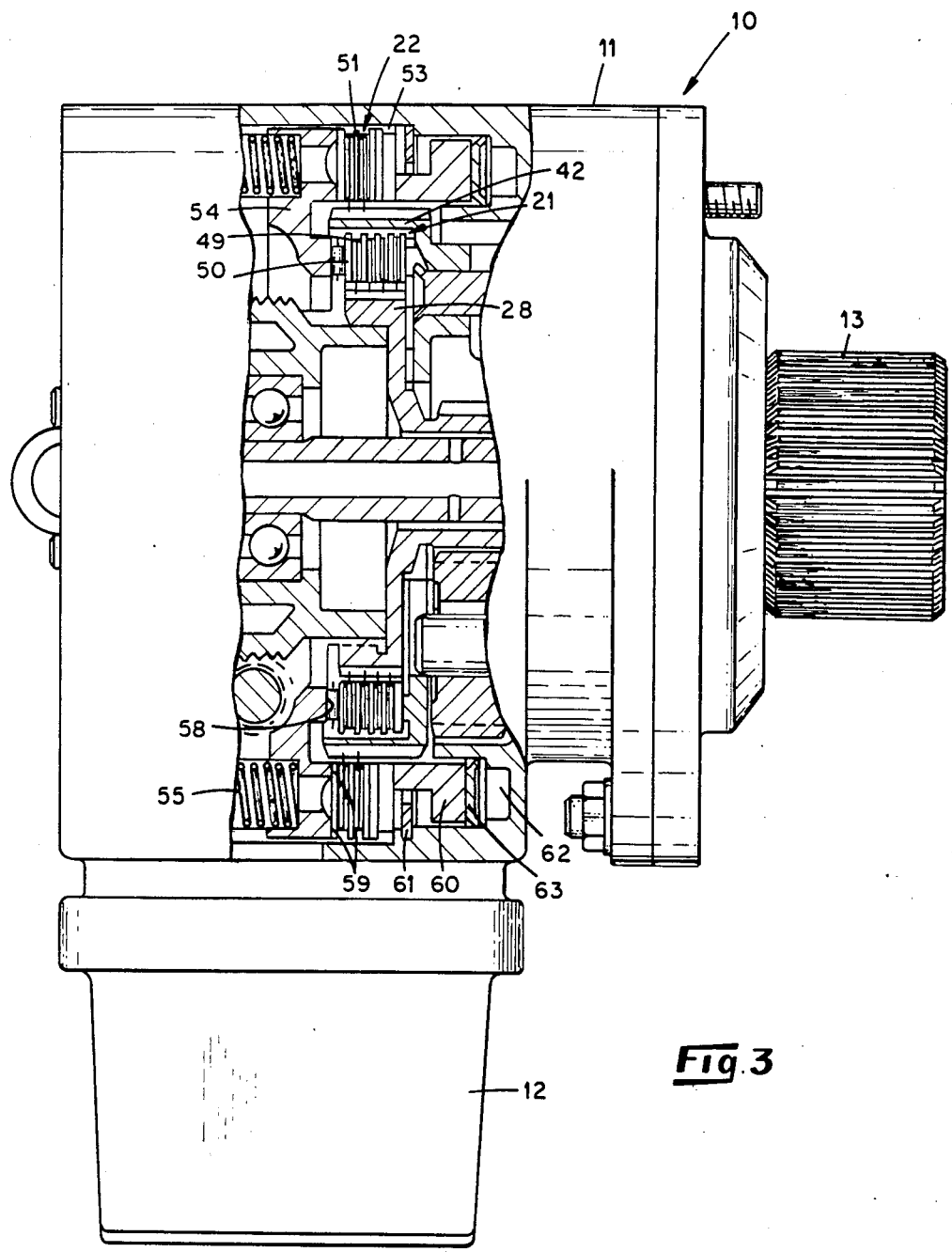
FIG. 3 is a partial cross-sectional side view similar to that of FIG. 2, but with the transmission in the direct drive mode.
Figure 6:
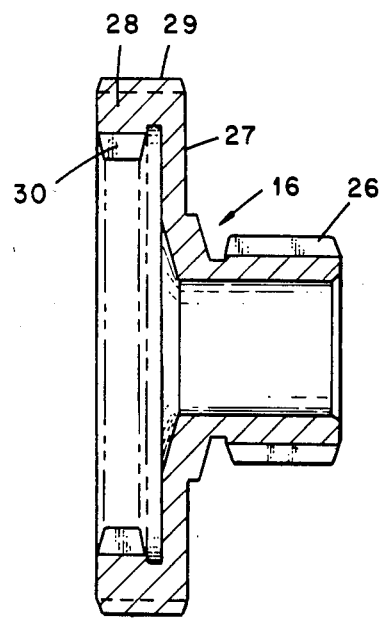
FIG. 6 is a cross-sectional view of a sun gear.

As illustrated in FIGS. 2 and 3, the driven sun gear 16 is concentrically mounted on the driving shaft 13, and is freely rotatable on it. As can be best seen in FIG. 6, the driven sun gear 16 is an integrally formed body comprising an externally toothed cylindrical gear portion 26 with a radially, outwardly extending circumferential rim 27 at one of its ends and a circumferential flange 28 projecting from the periphery of the rim 27 in an axial direction of the cylindrical gear portion 26 away from the cylindrical gear portion 26. The circumferential flange 28 is formed with external splines 29 and internal splines 30. The externally toothed cylindrical gear portion 26 has a smaller pitch circle than does either the external splines 29 and internal splines 30 of the circumferential flange 28. The externally toothed cylindrical gear portion 26 also has a smaller pitch circle than the driving sun gear 15.

With reference to FIG. 2, the driven shaft 14 is formed with a central aperture for receiving the rear bearing 24 which supports the other, or rear end of the driving shaft 13. Thus, the rear end of the driving shaft 13 is essentially rotatably supported by the driven shaft 14. The driven shaft 14 is rotatably supported in the housing 11 by means of a roller bearing 31 in the wall of the housing 11.

Figure 4:
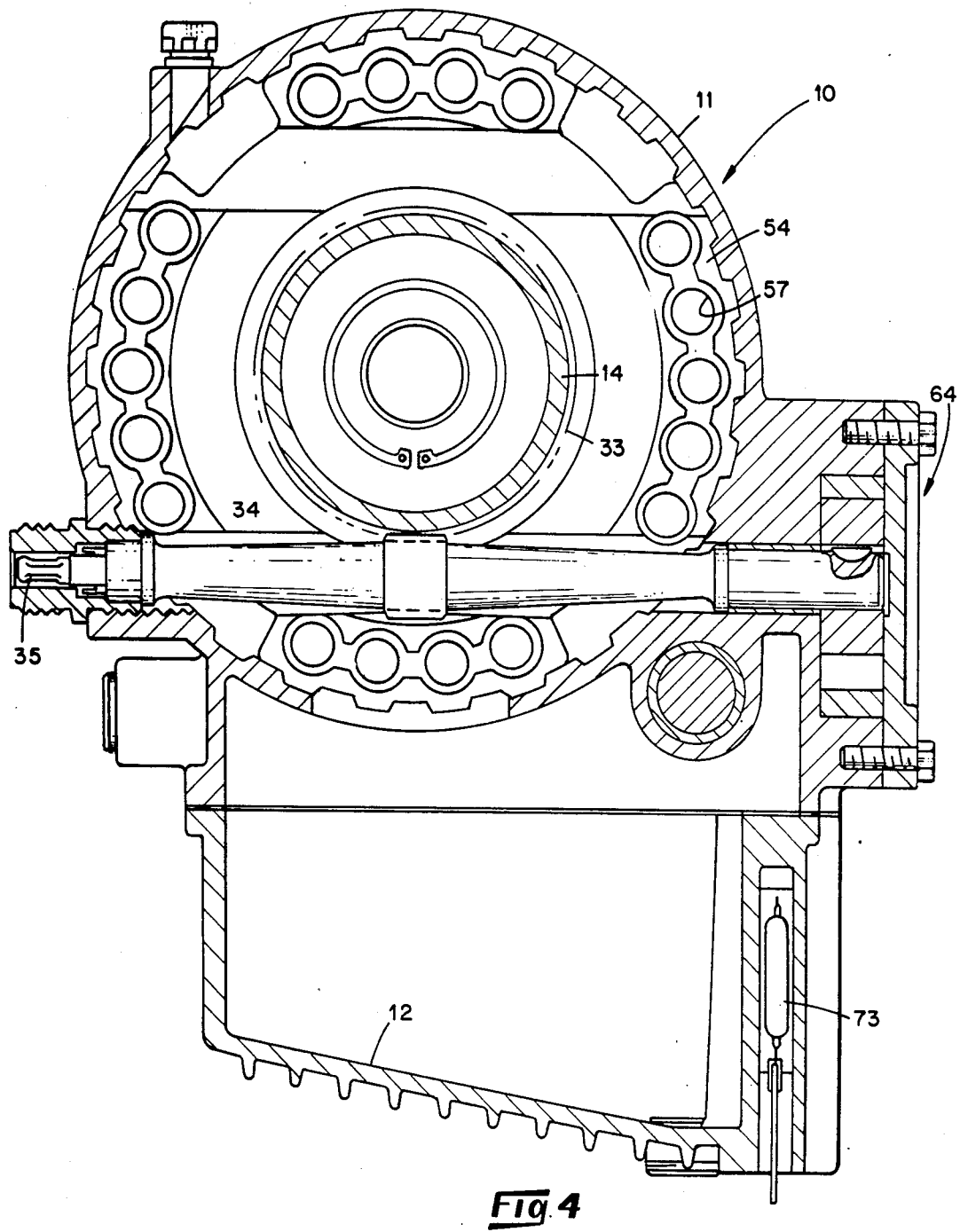
FIG. 4 is a cross-sectional view taken along line 4—4 in FIG. 2.

The end of the driven shaft 14 which extends into the housing 10 is formed with splines 32 of the same pitch circle as the internal splines 30 of the circumferential flange 28 of the driven sun gear 16. The splines 32 of the driven shaft 14 thus engage the splines 30 of the driven sun gear 16, so that the driven sun gear 16 and driven shaft 14 are drivingly interconnected. The driven shaft 14 is also formed with a circumferential worm gear profile 33 which engages a geared shaft 34 as can be seen in FIG. 4, to drive a vehicle speedometer which can be connected at one end 35 of the geared shaft 34.

With continued reference to FIGS. 1, 2, 3 and 4, and additional reference to FIG. 5, the first set of planet gears 18 comprise three first planet gears equally spaced from each other around the driving sun gear 15, and in constant mesh with the driving sun gear 15. The second set of planet gears 19 also comprise three second planet gears equally spaced from each other around the externally toothed cylindrical gear portion 26 of the driven sun gear 16, and in constant mesh with the cylindrical gear portion 26 of the driven sun gear 16. Each one of the first planet gears 18 is coaxially disposed on a common planet gear shaft 36 of the planet gear carrier 20 with a one of the second planet gears 19. The first planet gears 18 have a smaller pitch circle than the second planet gears 19. Further, the first 18 and second 19 planet gears on a common shaft 36 are connected together for concurrent rotation about their common shaft 36 at the same angular velocity. Preferably, each set of first 18 and second 19 planet gears on a common shaft 36 are integrally formed.

Again with reference to FIGS. 1, 2, 3 and 4, and also to FIG. 7 the planet gear carrier 20 comprises a first generally circular end plate 37 spaced from, generally parallel to and coaxially disposed with a second generally circular end plate 38. The first plate 37, for example, has three flanges 39 equally spaced about its periphery and projecting toward the second plate 38. Each of these flanges 39 has a radially outwardly extending boss 40 at its outer end. The bosses 40 abut the surface of the second plate 38 facing toward the first plate 37. The first and second plates are attached together by means of fasteners, such as rivets 41 or the like passing through appropriate mating apertures formed in the bosses 40 of the first plate 37 and in the second plate 38. The three planet gear shafts 36 are disposed in a circular, equally spaced apart array between the first and second plates 37 and 38, with their longitudinal axis mutually parallel and parallel to the driving shaft 13. Each planet gear shaft 36 is attached at one of its ends to the first plate 37 and at the other of its ends to the second plate 38. The second plate 38 also is formed with a circumferential flange 42 which projects from the periphery of the second plate 38 rearwardly or in a direction away from the first plate 37. This circumferential flange 42 is larger in circumference than the splined circumferential flange 28 of the driven sun gear 16. The circumferential flange 42 is also formed with external splines 43 and internal splines 44. Both the first 37 and second 38 plates are formed with centrally located apertures 45 and 46, respectively, which are coaxial with each other, and of a larger diameter than the driving shaft 15. The planet gear carrier 20 is located in the gear housing 11 coaxial with the driving shaft 15, the driving shaft 15 being received through the apertures 45 and 46, with the rearward extending circumferential splined flange 42 overlaying the circumferential splined flange 28 of the driven sun gear 16 in a radially spaced relationship thereto defining an annular space therebetween.

The planet gear carrier 20 is coaxially disposed with the driving shaft 13 and mounted for rotation in the gear housing 11 at the first circular plate 37 by means of, for example, a thrust collar 47 and a bearing 48. The thrust collar 47 abuts the front bearing 23, and the bearing 48 is disposed between the thrust collar 47 and the first circular plate 37 of the planet gear carrier 20.

With reference to FIGS. 2 and 3, the first clutch means 21 is an axially activated multi-disc type clutch comprised of a plurality of coaxially disposed alternating first friction members, such as annularly shaped clutch plates 49, and second friction members, such as annularly shaped clutch discs 50 which coact to provide a plurality of friction contact surfaces. The first clutch means 21 is disposed in an annular space defined between the splined, circumferential flange 28 of the driven sun gear 16 and the rearwardly extending splined circumferential flange 42 of the planet gear carrier 20.

The annularly shaped clutch discs 50, for example, are internally splined and mate with the external splines 29 of the circumferential flange 28 of the driven sun gear 16 for rotation with the driven sun gear 16 and relative movement thereto along the splines 29 in the direction of, or along the rotation axis of the planet gear carrier 20. The annularly shaped clutch plates 49, for example, are externally splined and mate with the internal splines 44 formed in the rearwardly projecting circumferential flange 42 of the planet gear carrier 20 for rotation with the planet carrier 20 and relative movement thereto along the splines 44 in the direction of, or along the rotational axis of the planet gear carrier 20.

The second clutch means 22 is also an axially activated multi-disc type clutch similar to the first clutch means 21 and is comprised of a plurality of coaxially disposed, alternating first friction members, such as annularly shaped clutch plates 51 and second friction members, such as annularly shaped clutch discs 52 which coact to provide a plurality of friction contact surfaces. The second clutch 22 is disposed in an annular space defined between the wall of gear housing 11 and the rearwardly extending circumferential flange 42 of the planet gear carrier 20. The clutch discs 52, for example, are internally splined and mate with the external splines 43 formed in the circumferential flange 42 planet gear carrier 20 for rotation with the planet gear carrier 20 and relative movement thereto along the splines 43 in the direction of, or along the rotational axis of the planet gear carrier 20. The clutch plates 51, for example, are externally splined and mate with splines 53 formed in the gear housing wall opposite the circumferential flange 42 of the planet gear carrier 20 fixing the clutch plates 51 against rotation and providing for movement relative to the wall of the housing along the splines 53 in the direction of, or along the rotational axis of the planet gear carrier 20.

With reference to FIGS. 2, 3, 4 and FIG. 8, a clutch pressure plate 54 is disposed in the gear housing 11 in concentric relationship with the driven shaft 14. Means are provided for mounting the pressure plate 54 for non-rotating movement toward and away from the first clutch means 21 and second clutch means 22 so that the plate 54 may selectively engage at least one of the first and second clutch means 21 and 22, and for holding the pressure plate 54 in a rotationally stationary position with respect to the gear housing 11 and second clutch means. For example, in the preferred embodiment the clutch pressure plate 54 includes axially directed external grooves which mate with the interior splines 53 formed on the inside of the wall of the gear housing 11, to provide a splined interconnection 299 between the housing 11 and plate 54 permitting only axial movement of the plate 54. The clutch pressure plate 54 is biased in the direction of the longitudinal axis of the driven shaft 14 toward the first and second clutch means 21, 22 by biasing means such as, for example, a plurality of compression springs 55. The compression springs 55 are illustrated as coil springs each having one end seated in an appropriate pocket 56 formed in the end wall of the gear housing 11 and the other end seated in an appropriate pocket 57 in the clutch pressure plate 54. The clutch pressure plate 54 has two concentric clutch contact surfaces 58 and 59 formed in its face adjacent the first and second clutch means 21 and 22, respectively. The inner contact surface 58 has a nominal diameter corresponding generally to the diameter of the first clutch means 21 and is adapted to contact the first clutch means 21 and provide rolling contact between the first clutch means 21 and the pressure plate 54 such as by roller bearings 301 as shown. The outer contact surface 59 has a nominal diameter corresponding generally to the diameter of the second clutch means 22, and is adapted to contact the second clutch means 22. Further, the inner and outer contact surfaces 58, 59 are stepped in relationship to each other. That is, the outer contact surface 59 protrudes from the clutch pressure plate 54 toward the second clutch means 22 a greater distance than the inner contact surface 58 protrudes from the clutch pressure plate 54 toward the first clutch means 21.

Hydraulically activated piston means comprised of, for example, an annular piston 60, is located in the housing 11 coaxial with the second clutch means 22 but on the opposite side thereof from the clutch pressure plate 54. The piston 60 is adapted to move toward and away from the second clutch means 22 in the direction of the longitudinal axis of the driving shaft 13 and to contact the second clutch means 22 on the side of the second clutch means 22 opposite that side of the second clutch means 22 contacted by the outer contact surface 59 of the clutch pressure plate 54 so that the second clutch means 22 will be compressed between the outer contact surface 59 of the clutch pressure plate 54 and piston 60.

Biasing means, such as a wave-type circular spring 61, is coaxially disposed with the piston 60 and located between the second clutch means 22 and the piston 60 to bias the piston 60 in a direction away from the second clutch means 22.

The hydraulically activated piston means also comprises an annular reaction chamber 62 formed in the gear housing 11 coaxial with the annular piston 60. The annular reaction chamber 62 is adjacent to and open to the annular piston 60 and cooperates with the piston to define a closed hydraulic reaction space for hydraulic fluid working on the annular piston 60. An annularly shaped seal 63 is located in the annular chamber 62 at the annular piston 60 to seal against the working fluid leaking past the annular piston 60.

In operation, to shift the overdrive transmission device 10 into the overdrive mode (shown in FIG. 2), the first clutch means 21 is disengaged and the second clutch means 22 is simultaneously engaged. To accomplish this working fluid is pumped into the annular chamber 62 and the hydraulic pressure of the fluid in the annular chamber 62 moves the annular piston 60 (to the left in FIG. 2), overcoming the biasing force of the wavetype circular spring 61, toward and into contact with the second clutch means 22 with sufficient force to move the clutch plates 51 and discs 52 of the second clutch 22 along their spline connections with the housing wall 11 and planet gear carrier flange 42, respectively, and against the outer contact surface 59 of the spring biased clutch pressure plate 54. The spring biased clutch pressure plate 54 is caused to move in a direction away from the clutch plates 51 and clutch discs 52 of the second clutch means 22 compressing the compression springs 55 until the hydraulic force against the annular piston 60 is no longer great enough to further compress the compression springs 55. Thus, the clutch plates 51 and clutch plates 52 of the second clutch 22 are compressively sandwiched between the annular piston 60 and outer contact surface 59 of the spring biased clutch pressure plate 54. This causes the alternating clutch plates 51 and clutch discs 52 to frictionally engage with one another so that there can be no relative rotational movement therebetween and the second clutch means 22 is engaged. Due to the splined engagement of the internal splines of the clutch discs 52 with the external splines 43 of circumferential flange 42 the planet gear carrier 20, and the splined engagement of the external splines of the clutch plates 51 with the splines 53 of the gear housing wall 11, the planet gear carrier 20 is locked or coupled to the gear housing. Therefore, the planet gear carrier 20 is prevented from rotating and is held stationary.

As the hydraulically activated annular piston 60 moves the clutch plates 51 and discs 52 of the second clutch means 22 against the outer contact surface 59 of the pressure plate 54, it exerts a force against the pressure plate 54 and causes it to axially move away from the first clutch means 21 and second clutch means 22, against the force of the compression springs 55, a sufficient distance, due to the stepped configuration of the inner and outer contact surfaces 58 and 59, respectively, to concurrently move the inner contact surface 58 of the clutch pressure plate 54 out of contact with the first clutch means 21. Thus, there is no axial force on the clutch plates 49 and discs 50 of the first clutch means 21, which would otherwise move them into mutual frictional engagement, and they are free to rotatably move relative to each other about their common axis. Thus, the first clutch means 21 becomes disengaged. As a result, the second sun gear 16 is free to rotate relative to the stationary planet gear carrier 20.

In summary, the overdrive transmission device 10 is shifted into the overdrive mode by means of the hydraulically activated second clutch means 22 which also concurrently disengages the resiliently biased first clutch means 21.

When the driving shaft 13 is caused to rotate in, for example, a clockwise rotation by a prime mover through the primary transfer case or transmission of a motor vehicle, the first sun gear 15, being connected to the driving shaft 13, of course, rotates in a clockwise direction with the driving shaft 13. The driving sun gear 15 being in constant mesh with the first set of planet gears 18 causes the first planet gears 18 to rotate about the planet gear shafts 36 but in an opposite rotational direction, for example, counter-clockwise. The second planet gears 19 being connected with the first planet gears 18 rotate with the first planet gears 18 at the same angular velocity and in the same rotational direction.

With the second clutch means 22 engaged, preventing rotation of the planet carrier 20 about the driving shaft 13, the first clutch means 21 is disengaged allowing rotation of the driven sun gear 16 relative to the stationary planet gear carrier 20. Since the second planet gears 19 are in constant mesh with the externally toothed gear portion 26 of the driven sun gear 16, the driven sun gear 16 is caused to rotate in a clockwise direction. The driven shaft 14, being drivingly connected to the driven sun gear 16 by means of the mating splines 32 of the driven shaft 14 and internal splines 30 of the circumferential flange 28 of the driven sun gear 16, is caused to rotate with the driven sun gear 16 in the same rotational direction, i.e., clockwise.

The final driven shaft to driving shaft ratio is, of course, a function of the ratios of the driving sun gear 15 to first planet gears 18, first planet gears 18 to second planet gears 19, and second planet gears 19 to the externally toothed gear portion 26 of the driven sun gear 22. In a preferred embodiment, the pitch diameters of these components were chosen to give a driving shaft 13 to driven shaft 14 ratio of 0.76:1.00, and are as follows:
Driving Sun Gear: 1.59627
First Planet Gear: 1.39673
Second Planet Gear: 1.59627
Externally Toothed Gear Portion of Driven Sun Gear: 1.39673

In operation, to shift the overdrive unit 10 out of the overdrive mode (shown in FIG. 2) and into the direct drive mode (shown in FIG. 3), the first clutch means 21 is engaged and the second clutch means 22 is simultaneously disengaged. Fluid is removed from the annular chamber 62 and the hydraulic pressure in the annular chamber 62 is, thus, relieved. The wave-type circular spring 61 forces the annular piston 60 away from the clutch plates 51 and clutch discs 52 of the second clutch means 22 so that the annular piston 60 no longer exerts a force against the clutch plates 51 and discs 52 of the second clutch means 22. The clutch pressure plate 54 moves toward the clutch plates 51 and discs 52 of the second clutch 22, and the clutch plates 49 and discs 50 of the first clutch means 21 under the influence of the compression springs 55. Because the plates 51 and discs 52 of the second clutch means 22 are no longer being forced together between the outer clutch contact surface 59 of the clutch pressure plate 54 and annular piston 60, there is no mutual frictional engagement and the clutch plates 51 and discs 52 are free to rotatably move relative to each other, thus, the second clutch means 22 is disengaged. Therefore, the planet carrier 20 is no longer locked to the housing 11 and is free to rotate.

As the clutch pressure plate 54 moves toward the first clutch means 21 and the second clutch means 22 under the influence of the compression springs 55, the inner clutch contact surface 58 of the clutch pressure plate 54 moves into contact with the clutch plates 49 and discs 50 first clutch means 21 forcing them together in the direction of the longitudinal axis of the planet gear carrier 20 and into mutual frictional engagement so that there can be no relative rotational movement therebetween, thus, the first clutch means 21 is engaged. Therefore, due to the splined engagement of the internal splines of the clutch discs 50 to the external splines 29 of the circumferential flange 28 of the driven sun gear 16, and the splined engagement of the external splines of the clutch plates 49 to the internal splines 44 of the circumferential flange 42 of the planet gear carrier 20, the second sun gear 16 is locked to the planet gear carrier 20 for rotation with planet gear carrier 20.

In summary, the overdrive transmission device 10 is shifted into the direct drive mode by means of the resiliently biased first clutch means 21 upon disengagement of the hydraulically activated second clutch means 22.

When the driving shaft 13 is caused to rotate in, for example, a clockwise rotational direction by a primary transfer unit or transmission, the driving sun gear 15, being connected with the driving shaft 13, rotates with the driving shaft 13 in a clockwise direction. The driving sun gear 15 being in constant mesh with the first planet gears 18 drives the first and second planet gears 18 and 19, respectively. Because the planet gear carrier 20 is locked to the driven sun gear 16 by means of the first clutch means 21, the first and second planet gears cannot rotate about their planet gear shafts 36 and, therefore, the planet gear carrier 20 is driven to rotate with the first sun gear 15 and drives the second sun gear 16 in the same rotational direction and angular velocity as the driving shaft 13. The driven shaft 14, being drivingly connected to the driven sun gear 16, by means of the mating splines 32 of the driven shaft 14 and internal splines 30 of the circumferential flange 28 of the driven sun gear 16, is caused to rotate with the planet gear carrier 20 in the same axial direction, i.e., clockwise. Thus, the driving shaft 13 and the driven shaft 14 have the same angular velocity.

It should be clearly understood from the foregoing discussion of the operation of the overdrive transmission device 10 that one or the other of the first clutch means 21 and second clutch means 22 is always engaged. There is no time that both the first clutch means 21 and second clutch means 22 are concurrently engaged nor concurrently disengaged. Furthermore, the engagement of one of the first clutch means 21 or second clutch means 22 takes place simultaneously with the disengagement of the other clutch means.

The fluid used to hydraulically move the annular piston 60 toward and into contact with the second clutch means 22 is the lubricating oil used to lubricate the gears and shafts of the overdrive transmission unit 10 itself.

With reference to FIGS. 1, 4 and 9, an oil pump, generally denoted as the numeral 64, is driven by the driven shaft 14 through the geared shaft 34. The oil pump 64 is used to both pump oil from the oil sump 12 for lubricating the gears and shafts of the overdrive unit 10 and as the working fluid for the annular piston 60 of the second clutch means 22. The oil pump 64 is in fluid flow communication with the oil in the sump 12 by means of, for example, a first oil passageway 65, and in fluid flow communication with the interior of the gear housing 11 by means of, for example, a first branch 66 of a two branched oil passageway 67.

A spring loaded relief valve 68 is disposed downstream of the oil pump 64 in a second branch 69 of the two branched oil passageway 67. An oil port 70 is formed through the wall of the relief valve 68 and is in fluid flow communication with the oil sump 12. The relief valve 68 is biased to a closed position closing the port 70 by means of, for example, a spring 71. The relief valve 68 also includes a magnetic stem portion 72 which generates a magnetic flux.

A switch 73, such as a mercury reed switch which is closed by magnetic flux, is located immediately adjacent the magnetic stem 72 of the relief valve 68 within the field of the magnetic flux generated by the magnetic stem portion 72 of the relief valve 68.

Figure 10:
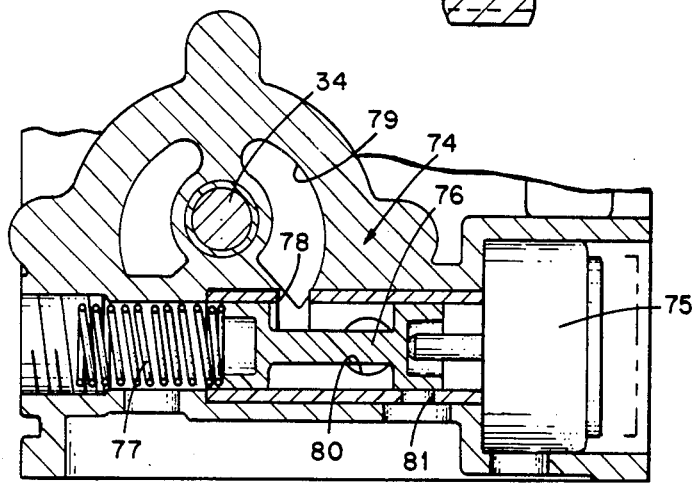
FIG. 10 is a cross-sectional view taken along line 10—10 in FIG. 1.

Now with reference to FIGS. 1 and 10, the oil pump 64 is also in fluid flow communication with the annular pocket 62 for activating the annular piston 60 through a hydraulic circuit which comprises a solenoid activated-spring return hydraulic spool valve 74 downstream of the oil pump 64. The spool valve 74 includes an electric solenoid 75 connected at one end of the spool 76 of the spool valve 74 which moves the spool 76 in one direction when it is activated, and a compression spring 77 abutting the opposite end of the spool 76 which moves the spool 76 in the opposite direction when the solenoid 75 is de-activated. The spool valve 74 is formed with a first oil port 78 through its wall between the ends of the spool 76 proximate the end of the spool 76 having the compression spring 77. The first oil port 78 is in fluid flow communication with the oil pump 64 through an oil passageway 79. The spool valve 74 is also formed with a second oil port 80 through its wall between the ends of the spool 76 proximate the end of the spool 76 which is connected to the solenoid 75. The second oil port 80 is in fluid flow communication with the annular chamber 62 through appropriate passageways formed in the housing 11. A third oil port 81 is formed through the wall of the spool valve 74 proximate the second oil port 80, but spaced to the opposite side thereof from the first oil port 78. The third oil port 81 is in fluid flow communication with the oil sump 12.

Figure 11:
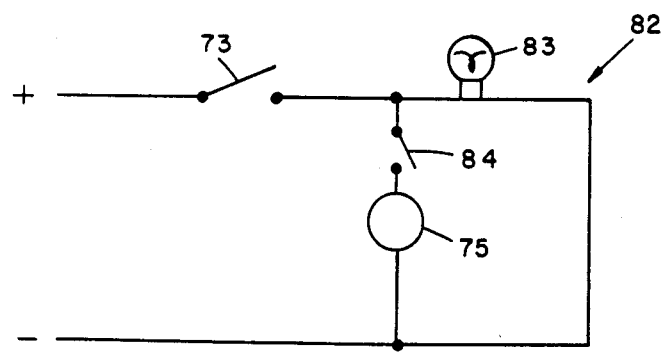
FIG. 11 is a schematic representative of an electric indicating-energizing circuit.

With reference to FIG. 11, an electric indicating and energizing circuit, generally denoted as the numeral 82, is provided to activate the solenoid 75 of the solenoid activated spool valve 74. This indicating and energizing circuit includes, in series, the reed switch 73 and an indicator light 83, and, in series, a manually operated solenoid activation switch 84 and the solenoid 75 of the solenoid operated spool valve 74. The reed switch 73 is also in series with the manually operated solenoid activation switch 84 so that the solenoid 75 of the spool valve 74 can only be activated by the solenoid activation switch 84 when the reed switch 73 is closed and the indicator light 83 is illuminated.

In operation, the oil pump 64 pumps oil from the oil sump 12 through the first branch 66 of the two branched passageway 67 to the interior of the gear housing 11 for lubrication, and into the second branch 69 of the two branched passageway 67 to the relief valve 68. When the relief valve 68 is closed, oil is prevented from passing through the oil port 70.

The solenoid 75 of the solenoid activated hydraulic spool valve 74 is de-energized and the spool 76 is biased by the spring 77 so that the spool 76 closes the first oil port 78, thus, preventing oil from flowing through the first oil passageway 79 from the oil pump 64 and into the spool valve 74. The second port 80 in the spool valve 74 remains open so that oil can drain from the annular chamber 62 of the second clutch means 22 into the spool valve 74, and the third port 81 is open so that oil can drain from the spool valve 74 to the oil sump 12.

As the speed of the input shaft 13 increases, corresponding to an increase in engine speed, the oil pump 64 moves an increasing volume rate of flow of oil into the two branched oil passageway 67. As the volume rate of flow increases to a predetermined value, for example 2.5 gallons per minute, the force of the oil begins to overcome the force of the spring 71 which holds the relief valve 68 closed, and the relief valve 68 begins to move toward an open position against the force of the spring 71 gradually opening the oil port 70. This allows oil to flow from the second branch 69 of the two branched passageway 67 through the now open port 70 and back into the sump 12.

As the relief valve 68 moves to the full open position, the magnetic flux responsive reed switch 73 sense the corresponding movement of the magnetic stem 72 of the relief valve 68 and closes the indicating and energizing circuit 82 illuminating the indicator light 83.

When the indicator light 83 is illuminated, the vehicle operator can manually energize the solenoid 75 of the spool valve 74 by closing the manually operated solenoid activation switch 84.

Upon energization, the solenoid 75 moves the spool 76 of the spool valve 74 against the force of the spool return spring 77 to open the first oil port 78 in the spool valve 74 and close the third oil port 81 in the spool valve. The second oil port 80 in the spool valve remains open. Thus, oil is now allowed to flow through the first oil passageway 79 from the oil pump 64 and into the spool valve 74. Because the second oil port 80 is open and the third oil port 81 is closed, the oil flowing into the spool valve 74 through the first oil port 78 is channeled through the second oil port 80 and into the annular chamber 62 of the second clutch means 22. The pressure of the oil in the annular chamber 62 exerts a force on the annular piston 60 forcing the annular piston 60 against the clutch plates 51 and discs 52 of the second clutch means 22 activating or engaging the second clutch means 22 and concurrently de-activating or disengaging the first clutch means 21, and the overdrive transmission device shifts to the overdrive mode as hereinabove discussed and shown in FIG. 2.

When the speed of the input shaft 13 decreases, corresponding to a decrease in engine speed, the volume rate of flow of oil moved by the oil pump gradually decreases. As this volume rate of flow decreases to a valve below the predetermined valve, the force of the oil in the second branch 79 of the two branched oil passageway 67 is no longer sufficient to hold the spring loaded relief valve 68 open against the force of the spring 71, and the spring 71 gradually moves the relief valve 68 back toward its closed position closing the oil port 70. As the relief valve 68 moves in the second branch 69 of the two branched passageway 67 to the closed position, the magnetic flux responsive reed switch 73 senses the corresponding movement of the magnetic stem 72 of the relief valve 68 and opens, thus, de-energizing the indicator light 83 and opening the indicating and energizing circuit 82. When the indicating and energizing circuit 82 is open, no current flows to the solenoid 75 of the solenoid activated spool valve 74, and the solenoid 75 is de-energized.

Upon de-energization of the solenoid 75, the return spring 77 of the spool valve 74 moves the spool 76 to close the first oil port 78 and, concurrently, to open the third oil port 81 of the spool valve 74. Oil is thus prevented from passing through the now closed first port 78 and into the spool valve 74. The annular chamber 62 of the second clutch 22 is now open to the oil sump 12 through the open second oil port 80 and into the spool valve 74, and out of the spool valve 74 through the now open third oil port 81 and into the oil sump 12. As the oil in the annular chamber 62 drains to the oil sump 12, the hydraulic pressure in the annular chamber 62 is relieved. Upon relief or decrease of the hydraulic pressure in the annular chamber 62, the wave-type circular spring 61 moves the annular piston 70 away from the second clutch means 22 so that the piston 60 is no longer forced against the clutch plates 51 and discs 52 of the second clutch means 22 and no longer forcably sandwiches clutch plates 51 and discs 52 together between it and the clutch pressure plate 54. Thus, the second clutch means 22 is disengaged and the first clutch means 21 is concurrently engaged and the overdrive transmission device 10 is in the direct drive mode as hereinabove discussed and shown in FIG. 3.

It should be clearly noted from the foregoing discussion of the hydraulic circuitry and electrical indicating and energizing circuitry that a failure either in the hydraulic circuitry or electrical indicating and energizing circuitry will automatically result in the engagement of the first clutch means 21 and simultaneous disengagement of the second clutch means 22. Thus, if the hydraulic circuitry, or the electrical indicating and energizing circuitry fails, the overdrive transmission device 10 will shift into the direct drive mode, if it is not already in the direct drive mode when the failure occurs.

FIG. 12 illustrates another advantageous embodiment of an overdrive transmission 110 embodying various features of the present invention to allow decreased engine speed at a given road speed.

The overdrive transmission 110 includes a housing 111 having an oil sump 112 in fluid communication with the gear housing, a driving shaft 113 rotatably mounted in the housing 111 and projecting from one end thereof, and a driven shaft 114 rotatably mounted in the housing 111 and projecting from the opposite end of the housing. As illustrated, the driven shaft 114 is coaxial with the driving shaft 113. A driving, or first sun gear 115 is concentrically disposed with the driving shaft 113 and connected thereto for rotation therewith. A driven, or second sun gear 116 is concentrically located with respect to the first sun gear 115 for rotation about a common axis with the driving sun gear and is drivingly connected to the driven shaft 114. The driven sun gear 116 has a smaller pitch circle than the driving sun gear 115. A planatary gear train 117 couples the driving shaft 113 to the driven shaft 114. The planetary gear train 117 includes a first set of planet gears 118 and a second set of planet gears 119 mounted on a common planet gear carrier 120. The first set of planet gears 118 are each in mesh with the driving sun gear 115, and the second set of planet gears 119 are each in mesh with the driven sun gear 116. A first clutch means 121 is used to selectively couple and uncouple the planet gear carrier 120 to the driven shaft 114, and a second clutch means 122 is used to concurrently, selectively uncouple and couple the planet carrier 120 to the housing 111.

The driving shaft 113 is mounted in the housing 111 by means of a roller bearing 123 located in the housing 111. A shaft seal 125 seals against oil leakage past the bearing and the driving shaft 113.

As shown, the first set of planet gears 118 comprises three first planet gears equally spaced from each other around the driving sun gear 115, and in constant mesh with the driving sun gear 115. The second set of planet gears 119 also comprises three second planet gears equally spaced from each other around the driven sun gear 116, and in constant mesh with the driven sun gear 116. Each one of the first planet gears 118 is coaxially disposed on a common planet gear shaft 136 of the planet gear carrier 120 with a different one of the second planet gears 119. The first planet gears 118 have a smaller pitch circle than the second planet gears 119. Further, the first and second planet gears, 118 and 119, respectively, on a common shaft 136, are connected together for concurrent rotation around their common gear shaft 136 at the same angular velocity. Preferably, each set of first and second planet gears on a common gear shaft are integrally formed.

The planet gear carrier 120 is illustrated as comprising a two part assembly of a first circular plate 137 and a coaxially disposed second circular plate 138. The first and second planet carrier plates 137 and 138, respectively, are attached together by means of, for example, a plurality of bolts 141 which pass through appropriate mating apertures formed in the first and second plates. The three planet gear shafts 136 are disposed in a circular equally spaced apart array between the first and second plates 137 and 138 with their longitudinal axes mutually parallel and parallel to the driving shaft 113. Each planet gear shaft 136 is attached at one of its ends to the first plate 137 and at the other of it's ends to the second plate 138. The second planet carrier plate 138 is also formed with a circumferential flange 142 which projects generally from the periphery of the second plate 138 rearwardly or in a direction away from the first plate 137. The circumferential flange 142 is also formed with external splines 143 and internal splines 144. Both the first and second carrier plates 137 and 138 are formed with centrally located bores or apertures 145 and 146, respectively, which are coaxial with each other and with the circumferential flange 142, and are of a larger diameter than the driving shaft 113 and driven shaft 114. The planet gear carrier 120 is located in the housing 111 coaxial with both the driving shaft 113 and the driven shaft 114. The driving shaft 113 is received through the aperture 145 in the front plate 137 and the driven shaft 114 is received through the rear plate 138.

The planet gear carrier 120 also has a circumferential flange 147 projecting from the periphery of the aperture 146 of the second or rear end plate 138 of the carrier 120 in a direction away from the first or front plate 137 of the carrier, and is mounted for rotation in the housing 111 by means of, for example, a roller bearing 148 located in the annular space between the driven shaft 114 and circumferential flange 146 with its inner race mounted to the driven shaft 114 and its outer race in contact with the circumferential flange 147.

An annularly shaped first clutch mounting armature 127 is coaxially disposed with the driven shaft 114. The armature 127 includes a circumferential flange 128 projecting from its periphery. The circumferential flange 128 has a smaller outside diameter than the inside diameter of the circumferential flange 142 of the planet carrier 120 and is concentrically located with the circumferential flange 142 of the planet carrier 120 so that an annular space is defined therebetween. The annular shaped first clutch mounting armature is attached to the driven shaft 114 for rotation therewith by means of, for example, mating splines formed in the driven shaft 114 and center bore of the annular first clutch mounting armature 127. The outside diameter peripheral surface of the flange 128 of the armature 127 is also formed with splines 129 for a reason hereinafter explained.

The first clutch means 121 is an axially activated multi-disc type clutch comprised of a plurality of coaxially disposed, alternating, first friction members such as, for example, annularly shaped clutch plates 149, and second friction members, such as, for example, annularly shaped, clutch discs 150 which coact to provide a plurality of friction contact surfaces. The first clutch 121 is disposed in an annular spaced defined between the external splined peripheral surface 129 of the peripheral flange 128 of the clutch mounting armature 127 and the rearwardly internally splined peripheral circumferential flange 142 of the planet gear carrier 120. The annularly shaped clutch discs 150, for example, are internally splined and mate with the external splines 129 of the peripheral flange 128 of the first clutch mounting armature 127 for rotation with the driven shaft 116 and for relative movement along the drive shaft 116 in the splines 129 in the direction of, or along the longitudinal axis of the driven shaft 114. The annularly shaped clutch plates 149, for example, are externally splined and mate with the internal splines 144 formed in the rearwardly projecting circumferential flange 142 of the planet gear carrier 120 for rotation with the planet gear carrier 120 and relative movement along the splines 144 in the direction of, or along the longitudinal axis of the driven shaft 114.

The second clutch means 122 is also an axially activated multi-disc type clutch similar to the first clutch means 121 and is comprised of a plurality of coaxially disposed alternating first friction members, such as annularly shaped clutch plates 151, and second friction members, such as annularly shaped clutch discs 152 which coact to provide a plurality of friction contact surfaces. The second clutch is disposed in an annular space defined between the wall of the gear housing 111 and the rearwardly extending circumferential flange 142 of the planet gear carrier 120. The clutch discs 152, for example, are internally splined and mate with the external splines 143 formed in the circumferential flange 142 of the planet gear carrier 120 for rotation with the planet gear carrier 120 and relative movement thereto along the splines 143 in a direction of, or along the longitudinal axis of the driven shaft 114. The clutch plates 151, for example, are externally splined and mate with splines 153 formed in the housing 111 opposite the circumferential flange 142 of the planet gear carrier 120 fixing the clutch plate 151 against rotation and providing for movement relative to the wall of the housing 111 along the splines 153 in the direction of, or along the longitudinal axis of the driven shaft 114.

A clutch pressure plate 154 is disposed in the housing 111 in concentric relationship with the driven shaft 114. Means are provided for mounting the pressure plate 154 for non-rotating movement toward and away from the first clutch means 121 and second clutch means 122 so that the plate 154 may selectively engage at least one of the first and second clutch means 121 and 122, and for holding the pressure plate 154 in a rotationally stationary position with respect to the housing 111 and second clutch means 122. For example, in the preferred embodiment a splined interconnection 303 may be provided between the pressure plate 154 and the internal splines 153 formed in the housing 111 as in the previously described embodiment shown in FIG. 2. The clutch pressure plate 154 is biased in the direction of the longitudinal axis of the driven shaft 114 toward the first and second clutch means 121 and 122 by biasing means such as, for example, a plurality of compression springs 155. The compression springs 155 are illustrated as coil springs each having one end seated in a different appropriate pocket 156 formed in the end wall of the housing 111 and the other end seated in an appropriate pocket 157 formed in the clutch pressure plate 154. The clutch pressure plate 154 has two concentric clutch contact surfaces 158 and 159 formed in its face adjacent the first and second clutch means 121 and 122, respectively. The inner contact surface 158 has a nominal diameter corresponding generally to the diameter of the first clutch means 121, and is adapted to engage the first clutch means 121 and provide rolling contact between the first clutch means 121 and the pressure plate 154 such as by roller bearings 305 as shown. The outer contact surface 159 has a nominal diameter corresponding generally to the diameter of the second clutch means 122, and is adapted to engage the second clutch means 122. Further, the inner and outer contact surfaces 158 and 159 are stepped in relationship to each other. That is, the inner contact surface 158 protrudes from the face of the clutch plate 154 toward the first clutch means 121 by a greater distance than the outer contact surface 159 protrudes from the face of the clutch pressure plate 154 toward the second clutch means 122.

Hydraulically actuated piston means comprised of, for example, an annular piston 160, is located in the housing 111 coaxial with the second clutch means 122 but on the opposite side thereof from the clutch pressure plate 154. The annular piston 160 is of a deep cupped configuration and is adapted to move toward and away from the second clutch means 122 in the direction of the longitudinal axis of the driving shaft 113 and driven shaft 114 and to contact the second clutch means 122 on the side of the second clutch means 122 opposite that side thereof contacted by the outer contact surface 159 of the clutch pressure plate 154 so that the second clutch means 122 will be compressed between the outer contact surface 159 of the clutch pressure plate 154 and the hydraulic piston 160.

Biasing means, such as small compression coil springs 161 coact between the clutch pressure plate 154 and the annular piston 160 to bias the piston 160 away from the second clutch means 122. The small compression coil springs 161 are disposed in pockets formed in the housing 111 around the periphery of the second clutch means 122. One end of each compression coil spring 161 is in contact with the clutch contact face of the hydraulic piston 160, and has its other end in contact with the outer contact surface 159 of the clutch pressure plate 154. The total spring modulus of the small coil springs 161 is less than the total spring modulus of the compression springs 155 and, therefore, do not cause the clutch pressure plate 154 to move against the force of the compression springs 155 which bias the clutch pressure plate 154 toward the first clutch means 121 and second clutch means 122.

The hydraulically activated piston means also includes an annular chamber 162 formed in the housing 111 coaxial with the annular piston 160. The annular chamber 162 is defined by the housing 111 near the front wall thereof, and the hydraulic piston 160 to define a closed hydraulic reaction space for hydraulic fluid working on the annular piston 160. An annular seal 163 is located in an appropriate seal seat formed around the outside peripheral surface of the hydraulic piston 160 to seal against the working fluid leaking past the piston between the piston 160 and the housing wall 111. Another seal 163A is seated in an appropriate seal seat in the piston to seal between the piston and the front wall of the housing.

In operation, to shift the overdrive transmission device 110 into the overdrive mode, the first clutch means 121 is disengaged and the second clutch means 122 is simultaneously engaged. To accomplish this, working fluid is pumped into the annular chamber 162 and the hydraulic pressure of the fluid in the annular chamber 162 moves the annular piston 160, overcoming the biasing force of the piston biasing coil springs 161, toward and into contact with the second clutch means 122 with sufficient force to move the clutch plates 151 and discs 152 of the second clutch means 122 along their splined connections with the housing wall 111 and planet gear carrier flange 142, respectively, and against the outer contact surface 159 of the spring biased clutch pressure plate 154. The spring biased clutch pressure plate 154 is caused to move compressing the compression springs 155 until the hydraulic force against the annular piston 160 is no longer great enough to further compress the compression springs 155. Thus, the clutch plates 151 and clutch discs 152 of the second clutch 122 are compressively sandwiched between the annular piston 160 and the outer contact surface 159 of the spring biased clutch pressure plate 154. This causes the alternating clutch plates 151 and clutch discs 152 to frictionally engage with one another so that there can be no relative rotational movement therebetween and the second clutch means 122 is engaged. Due to the splined engagement of the internal splines of the clutch discs 152 and the external splines 143 of the circumferential flange 142 of the planet gear carrier 120, and the splined engagement of the external splines of the clutch plates 151 with the splines 153 of the gear housing wall 111, the planet gear carrier 120 is locked or coupled to the gear housing. Therefore, the planet gear carrier 120 is prevented from rotating and is held stationary.

When the hydraulically actuated annular piston 160 moves the clutch plates 151 and clutch discs 152 of the second clutch means 122 against the outer contact surface 159 of the pressure plate 154, it exerts a force against the clutch pressure plate 154 and causes it to axially move away from the first clutch means 121 against the force of the compression springs 155, a significant distance, and due to the stepped configuration of the inner and outer contact surfaces 158 and 159, to concurrently move the inner contact surface 158 of the clutch pressure plate 154 out of contact with the first clutch means 121. Thus, there is no axial force on the clutch plates 149 and clutch discs 150 of the first clutch means 121 and they are free to rotatably move relative to each other about their common axis and the first clutch means 121 is disengaged.

In summary, when the overdrive transmission device 110 is shifted into the overdrive mode, the second clutch means 122 is engaged and the first clutch means 121 is simultaneously disengaged.

In the overdrive mode, when the driving shaft 113 is caused to rotate in, for example, a clockwise rotation by a prime mover of a motor vehicle, the first sun gear 115 being connected to the driving shaft 113, of course, rotates in a clockwise direction with the driving shaft 113. The driving sun gear 115 being in constant mesh with the first set of planet gears 118 causes the first planet gears 118 to rotate above the planet gear shafts 136 but in the opposite rotational direction, for example, counterclockwise. The second planet gears 119 being connected with the first planet gears 118 rotate with the first planet gears 118 at the same angular velocity and in the same rotational direction.

With the second clutch means 122 is engaged, preventing rotation of the planet carrier 120, and the first clutch means 121 is disengaged, the planet gears 118 and 119 revolve about the driving sun gear 115. As the planet gears 118 and 119 revolve about the driving sun gear 115, they cause the driven sun gear 116 to rotate in the same rotational direction as the driving shaft 113. The driven shaft 114, being drivingly connected to the driven sun gear 116, is caused to rotate with the driven sun gear 116 in the same rotational direction, i.e., clockwise.

In order to shift the overdrive unit 110 out of the overdrive mode and into the direct drive mode, the first clutch means 121 is engaged and the second clutch means 122 is simultaneously disengaged. To accomplish this, pressure is relieved from the annular chamber 162. The small compression coil springs 161, together with the springs 155, coacting between the clutch pressure plate 154 and the hydraulic piston 160 force the annular hydraulic piston 160 away from the clutch plates 151 and clutch discs 152 of the second clutch means 122 axially of the driving shaft 113 and driven shaft 114 toward the front of the transmission housing so that the annular piston 160 no longer exerts a force against the friction members 151 and 152 of the second clutch means 122. The clutch pressure plate 154 moves toward the clutch plates 151 and clutch discs 152 of the second clutch means 122 and the clutch plates 149 and clutch discs 150 of the first clutch means 121 under the influence of the compression springs 155. Because the clutch plates 151 and clutch discs 152 of the second clutch means 122 are no longer being forced together between the outer clutch contact surface 159 of the clutch pressure plate 154 and the annular piston 160, there is no mutual frictional engagement and the clutch plates 151 and clutch discs 152 are free to rotatably move relative to each other and the second clutch means 122 is disengaged. Therefore, the planet gear carrier 120 is no longer locked to the housing and is free to rotate.

As the clutch pressure plate 154 moves toward the first clutch means 121 and the second clutch means 122 under the influence of the compression springs 155, the inner clutch contact surface 158 of the clutch pressure plate 154 moves into contact with the clutch plates 149 and clutch discs 150 of the first clutch means 121 forcing them together in the direction of the rotational axis of the planet gear carrier 120 to mutual frictional engagement so that there can be no relative movement therebetween and the first clutch means 121 is engaged. Thus, due to the engagement of the splines of the clutch discs 150 to the external splines 129 on the outside peripheral surface of the first clutch mounting armature 127, and the engagement of the external splines of the clutch plates 149 to the internal splines 144 of the circumferential flange 142 of the planet gear carrier 120, the driven shaft 114 is locked to the planet gear carrier 120 for rotation therewith at the same annular velocity and in the same rotational direction as the driving shaft 113.

When the driving shaft 113 is caused to rotate in, for example, a clockwise rotation, the driving sun gear 155, being connected to the driving shaft 113 rotates with the driving shaft 113. The driving sun gear 115 being in constant mesh with the first planet gears 118 drives the planet carrier 120 so that the planet gear carrier 120 rotates with the driving sun gear 115 in the same direction of rotation. The planet gear carrier 120 being locked to the driven shaft 114 by means of the first clutch means 121 causes the driven shaft 114 to rotate in the same direction and at the same angular velocity as the planet gear carrier 120 and driving shaft 113.

Figure 13:
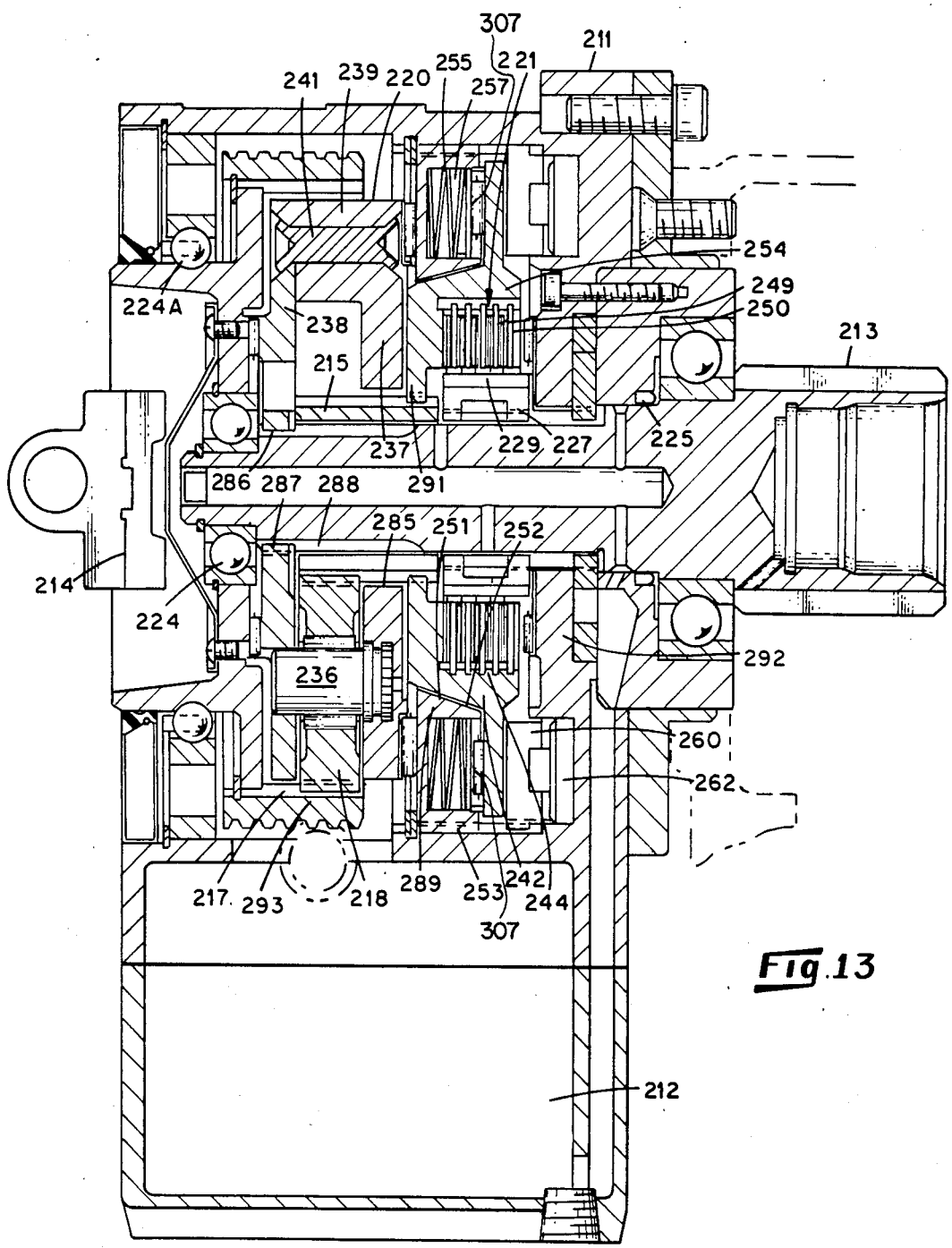
FIG. 13 is a cross-sectional side view of yet another advantageous embodiment of an overdrive transmission embodying various features of the present invention in the overdrive mode.

Another embodiment of an overdrive transmission 210, embodying various features of the present invention as applied to a single planetary gear construction, is illustrated in FIG. 13. As with the previously discussed two embodiments, the overdrive transmission 210 is used to allow decreased engine speed at a given road speed.

The overdrive transmission 210 includes a housing 211 having an oil sump 212 in fluid communication with the interior of the gear housing, a driving shaft 213 rotatably mounted in the housing 211 projecting from one end thereof, and a driven shaft 214 rotatably mounted in the housing 211 projecting from the opposite end of the housing. As shown, the driven shaft 214 is coaxially located with respect to the driving shaft 213. A sun gear 215 is concentrically disposed with the driving shaft 213 and is mounted thereon to allow selective relative rotation between the sun gear 215 and driving shaft 213 about the longitudinal axis of the driving shaft 213. A planetary gear train 217 couples the driving shaft 213 to the driven shaft 214.

The planetary gear train 217 includes a set of planet gears 218 mounted to a planet gear carrier 220. The planet gears 218 are each in constant mesh with the sun gear 215. A first clutch means 221 is used to selectively couple and uncouple the sun gear 215 to the driving shaft 213 so that when the first clutch means 221 is engaged the sun gear 215 will rotate with the driving shaft 213, and when the first clutch means 221 is disengaged the driving shaft 213 can rotate relative to the sun gear 215. A second clutch means 222 is used to concurrently and selectively uncouple and couple the sun gear 215 to the transmission housing 211 so that when the second clutch means 222 is engaged, coupling the sun gear 215 to the housing wall, the sun gear 215 is held stationary and does not rotate with the driving shaft 213.

The driving shaft 213 is mounted in the gear housing 211 by means of a front bearing 223 located at the end of the driving shaft 213 in the housing 211, and a rear bearing 224 at the other end from the driving shaft 213. A seal 225 seals against oil leakage past the front bearing 223 and the driving shaft 213.

As illustrated, the sun gear 215 is concentrically mounted over the driving shaft 213 and is spaced therefrom so that the driving shaft 213 is adapted to be rotated independently of the sun gear 215.

The driven shaft 214 is formed with a central aperture for receiving the rear bearing 224 which supports the rear end of the driving shaft 213. Thus, the rear end of the driving shaft 213 is essentially rotatably supported by the driven shaft 214. The driven shaft 214 is rotatably supported in the gear housing 211 by means of a roller bearing 224A where the driven shaft protrudes from the gear housing 211.

The planet gear carrier 220 comprises a first generally circular end plate 237 spaced from, generally parallel to, and coaxially disposed with a second generally circular end plate 238. The first plate 237, for example, has three flanges 239 equally spaced about its periphery and projecting toward the second plate 238. The first and second end plates are attached together by means of fasteners, such as rivets 241 passing through appropriate mating apertures formed through the flanges 239 and through the second plate 238. The three planet gear mounting shafts 236 are disposed in a circular, equally spaced-apart array between the first and second plates 237 and 238 with their longitudinal axes mutually parallel and parallel to the driving shaft 213. Each planet gear shaft 236 is attached at one of its ends to the first plate 237 and the other of its ends to the second plate 238. Both the first and second end plates 237 and 238 are formed with centrally located apertures 285 and 286, respectively, which are coaxial with each other, and of a larger diameter than the diameter of the driving shaft 213. The central aperture 285 of the first plate 237 longitudinally receives the driving shaft 213 therethrough with substantial clearance therebetween, and the central aperture 286 of the second plate 238 is formed with gear teeth 287 which mate with gear teeth 288 formed in the driving shaft 213 adjacent the support bearing 224 at the rear end of the driving shaft 213. The planet gear carrier 220 is located in the gear housing 211 concentric with the driving shaft 213 with the driving shaft 213 being received through the central apertures 285 and 286 and with the gear teeth 287 formed in the central aperture 286 in mesh with the gear teeth 288 formed in the driving shaft 213.

The first clutch means 221 is an axially activated multi-disc type clutch comprised of a plurality of coaxially disposed alternating first friction members, such as annularly shaped clutch plates 249, and second friction members, such as annularly shaped clutch discs 250 which coact to provide a plurality of friction contact surfaces. The annularly shaped clutch discs 250, for example, are internally splined and the annularly shaped clutch plates 249, for example, are externally splined.

The second clutch means 222 is comprised of a stationary, annularly shaped cone clutch 289 located in the housing 211 concentric with the driving shaft 213, and an annular clutch pressure plate 254 also located in the housing 211 concentric with the driving shaft 213 next to the cone clutch 289, and mounted for movement along the longitudinal axis of the driving shaft 213 toward and away from the cone clutch 289.

The annularly shaped cone clutch 289 is internally formed with a cone clutch surface 251 and is externally splined. The external splines of the cone clutch 289 mate with splines 253 formed in the gear housing wall opposite the cone clutch 289 fixing the cone clutch, and therefore fixing the cone clutch surface 251, against rotation. The annular cone clutch 289 is also formed with a concentric annular spring pocket 257 with its opening facing toward the clutch pressure plate 254.

The annular clutch pressure plate 254 is formed with an external cone clutch surface 252 which is adapted to mate with the cone clutch surface 251 of the annular cone clutch 289 when the pressure plate 254 moves toward the annular cone clutch 289. The pressure plate 254 is also formed with an internal concentric annular shoulder 242 which is open toward the driving shaft 213 and toward the front end of the transmission. The peripheral surface of the annular shoulder 242 is formed with splines 244. A circumferential flange 290 radially projects outwardly of the pressure plate 254 and extends closely past the opening of the annular spring pocket 257 in the annular cone clutch 289. The clutch pressure plate 254 also has a second circumferential flange 291 radially projecting inwardly from a location near the annular shoulder 242. The second circumferential flange 291 is formed with internal gear teeth which mesh with the gear teeth of the sun gear 215 so that the clutch pressure plate 254 will rotate with the sun gear 215.

An annularly shaped first clutch mounting armature 227 is coaxially located with the driving shaft 213. The outer peripheral surface of the armature 227 is smaller in diameter than the inside diameter of the shoulder 242 of the pressure plate 254 and is concentrically located with respect to the shoulder 242 so that an annular space is defined therebetween. The annularly shaped first clutch mounting armature is attached to the driving shaft 213 for rotation therewith by means of, for example, mating splines formed in the driving shaft 213 and center bore of the annular first clutch mounting armature 227. The outer peripheral surface of the armature 227 is also formed with splines 229 facing the splines 244 of the shoulder 242 across the annular space.

The clutch plates 249 and clutch discs 250 of first clutch means 221 is located in the annular space between the outer splined peripheral surface of the armature 227 and shoulder 242 of the pressure plate 254. The annularly shaped clutch discs 250, for example, are internally splined and mate with the splines 229 formed in the outer peripheral surface of the annular armature 227 so that the clutch discs 250 will rotate with the driving shaft 213 and can move relative to the driving shaft along the splines 229 in the direction of the longitudinal axis of the driving shaft. The annularly shaped clutch plates 249, for example, are externally splined and mate with the splines 244 formed in the annular shoulder 242 of the clutch pressure plate 254 so that the clutch plates 249 will rotate with the pressure plate 254, and the clutch plates 249 can move relative to the splines 244 in the shoulder 242 in the direction of, or along the longitudinal axis of the driving shaft 213. The first clutch means 221 also comprises a stationary annular clutch plate 292 concentrically located with the shoulder 242.

The clutch pressure plate 254 is biased in the direction of the longitudinal axis of the driving shaft 213 away from the annular cone clutch 289 by biasing means such as, for example, the compression spring 255. The compression spring 255 is illustrated as a Bellville spring pack disposed in the annular pocket 257 in the cone clutch 289 so that it bears against the first circumferential flange 290 of the pressure plate 254 through the opening of the annular pocket 257 and provides rolling contact such as by roller bearings 307 as shown.

Hydraulically activated piston means comprised of, for example, an annular piston 260, is located in the gear housing 211 concentric with the annular cone clutch 289 but on the opposite side of the first circumferential radially extending flange 290 of the pressure plate 254 from the annular cone clutch 289. The piston 260 is adapted to move toward and away from the annular cone clutch 289 in the direction of the longitudinal axis of the driving shaft 213 and is adapted to contact the first circumferential radially extending flange 290 on the side of the first circumferential flange 290 opposite that side thereof which is contacted by the Bellville spring pack 255 in the annular pocket 257 of the cone clutch 289.

The hydraulically activated piston means also comprises an annular chamber 262 formed in the gear housing 211 coaxial with the annular piston 260. The annular chamber 262 is adjacent and open to the annular piston 260 and cooperates with the piston 260 to define a closed hydraulic reaction space for hydraulic fluid working on the annular piston 260. The face of the annular piston 260 which comes into contact with the first circular radially extending flange 290 of the pressure plate 254 is faced with a friction generating face.

An internally toothed ring gear 293 is coaxially disposed with the driving shaft 213 and driven shaft 241 and is concentrically located with the plant carrier 220 with the gear teeth of the ring gear 293 in mesh with the planet gears 218. The driven shaft 214 is attached to the ring gear 293 for rotation therewith.

In operation, to shift the overdrive transmission device 210 into the overdrive mode, the first clutch means 221 is disengaged and the second clutch means 222 is simultaneously engaged. This is done by pumping working fluid into the annular chamber 262 so that the hydraulic pressure of the fluid in the annular chamber 262 moves the annular piston 260, overcoming the biasing force of the Bellville spring pack 255, toward the annular stationary clutch cone 289 of the second clutch means 222 with sufficient force to move the clutch cone surface 252 of the pressure plate 254 into frictional contact with the clutch surface 251 of the annular stationary clutch cone 289 thus engaging the second clutch means 222. Due to the fact that the annular stationary cone clutch 289 is connected to the housing 211 so that it will not rotate, and because the gear teeth formed in the second circumferential flange 291 of the pressure plate 254 are in mesh with the gear teeth of the sun gear 215, the sun gear 215 is coupled to the gear housing 211 and is itself locked against rotation. Therefore, the sun gear 215 is prevented from rotating and is held stationary while the driving shaft 213 rotates.

As the hydraulically actuated annular piston 260 moves toward and into contact with the circumferential flange 290 of the pressure plate 254 and moves the pressure plate 254 toward the annular cone clutch 289 against the force of the Bellville spring pack, the pressure plate 254 moves away from the stationary clutch plate 292 of the first clutch means 221 relieving the force compressing the alternating clutch plates 249 and clutch discs 250 of the first clutch 221 into mutual contact. Thus, there is no axial force on the clutch plates 249 and clutch discs 250 of the first clutch means 221 which would otherwise move them into mutual frictional engagement and they are free to rotatably move relative to each other about their common axis which is coaxial with the longitudinal axis of the driving shaft 213, and the first clutch means 221 is disengaged.

In summary, when the overdrive transmission device is shifted into the overdrive mode, the second clutch means 222 is engaged and the first clutch means 221 is simultaneously disengaged.

When the driving shaft 213 is caused to rotate in, for example, a clockwise rotational direction, the sun gear 215 is held stationary by means of its tooth connection to the pressure plate 254 which is in turn held stationary by the engaged second clutch means 222. The planet carrier 220, being connected to the driving shaft 213 by means of the gear teeth 288 formed in the driving shaft 213 which mate with the gear teeth 287 formed in the second plate 238 of the planet carrier, rotates with the driving shaft 213 at the same angular velocity and the same rotational direction. The planet gears 218 are thereby caused to rotate in a clockwise direction about their planetary gear shafts 236 and to remove in a clockwise direction about the stationary sun gear 215. As the planet gears 218 rotate about their planetary gear shaft 236 and revolve about the stationary sun gear 215, a clockwise rotational motion is imparted to the ring gear 293 about the longitudinal axis of the driving shaft 213 but at a higher rotational velocity than that of the driving shaft 213. The driven shaft 214 being connected to the ring gear 293 rotates the ring gear 293 in the same rotational direction and the higher angular velocity than the driving shaft 213.

In operation, to shift the overdrive unit 210 out of the overdrive mode and into the direct drive mode, the first clutch means 221 is engaged and the second clutch means 222 is simultaneously disengaged. To accomplish this hydraulic fluid is removed from the annular chamber 262 with the result that the hydraulic pressure in the annular chamber 262 is, thus, relieved. The Bellville spring pack 255 in the annular pocket 257 of the stationary cone clutch 289 exerts a force on the first circumferential radial flange 290 of the pressure plate 254 pushing the pressure plate 254 in a direction away from the cone clutch 289 toward the annular hydraulic piston 260 and toward the stationary clutch plate 292 of the first clutch means 221. In pushing the clutch pressure plate 254 toward the annular piston 260, the cone clutch surface 252 of the pressure plate 254 is disengaged and the cone clutch surface 251 of the annular cone clutch 289 and the second clutch means 222 is disengaged. Therefore, the pressure plate 254 and sun gear 215 are no longer locked to the housing.

As the clutch plate 24 moves toward the annular piston 260 and toward the stationary clutch pressure plate 292 of the first clutch means 221 under the influence of the Bellville spring pack 255, the first clutch plate 249 and discs 250 which are located in the annular space defined between the shoulder 242 of the pressure plate 254 and the outer peripheral splined surface of the armature 227 are forced by the movable clutch pressure plate 292 against the stationary clutch pressure plate 292 forcing the clutch plates 249 and clutch discs 250 of the first clutch means 221 together in the direction of the longitudinal axis of the driving shaft 213 and into mutual frictional engagement so that there can be no relative movement therebetween, and the first clutch means 221 is engaged. Thus, due to the splined engagement of the internal splines of the clutch discs 250 to the external splines 229 of the first clutch mounting armature 227, and the splined engagement of the external splines of the clutch plate 249 to the splines 244 formed in the peripheral surface of the shoulder 244 of the clutch pressure plate 289, the clutch pressure plate 289 rotates in the same axial direction and the same angular velocity as the driving shaft 213. Furthermore, because of the fact that the clutch pressure plate 289 is connected to the sun gear 215 by means of the gear teeth formed in the second circumferential flange 291 of the clutch pressure plate 289, the sun gear 215 revolves with the clutch pressure plate 289 in the same axial direction and same angular velocity as the driving shaft 213. Concurrently, the planet gear carrier 220, being connected to the driving shaft 213 by means of the gear teeth 287 of the central bore 286 in the end plate 238 of the carrier 220 meshing with the gear teeth 288 formed in the driving shaft 213, also rotates in the same angular direction and same angular velocity as the driving shaft 213. For the reason that the sun gear 215 and planet gear carrier 220 are rotating in the same angular direction and the same velocity as the driving shaft 213, the planet gears 218 do not rotate about their planet gear shafts 236, but remain stationary relative to the shafts 236 and revolve with the carrier 220 about the longitudinal axis of the driving shaft 213 in the same angular direction and at the same angular velocity as the driving shaft 213. The ring gear 293 having its internal teeth in mesh with the teeth of the planet gears 218 rotates with the planet gear carrier 220 in the same angular direction and the same angular velocity as the planet gear carrier and, therefore, the same angular direction and angular velocity as the driving shaft 213. The driven shaft 214, being connected to the ring gear 292 for rotation therewith, rotates with the ring gear 292 in the same angular direction and same angular velocity as the driving shaft 213. Thus, the driving shaft 213 and driven shaft 214 have the same angular velocity and direction of rotation.

It is foreseeable that in some instances it would be desirable that during a shifting event of the overdrive transmission from the direct drive mode to the overdrive mode that the first or direct drive clutch be completely disengaged while the second, or overdrive clutch is gradually engaged, and that when shifting from the overdrive mode to the direct drive mode that the second or overdrive clutch be gradually disengaged before the first or direct drive clutch is engaged. By way of abbreviation, this momentary disengagement of the direct drive clutch during a shifting event as the overdrive clutch is gradually engaged or disengaged can be referred to as a partially neutral mode.

This partially neutral mode can be incorporated in any of the embodiments of the overdrive transmission 10, 110 or 210 discussed above. However, for the sake of brevity, the incorporation of the partially neutral mode will herinafter be discussed in regard to the embodiment of the overdrive transmission 110 of FIG. 12.

Figure 14:
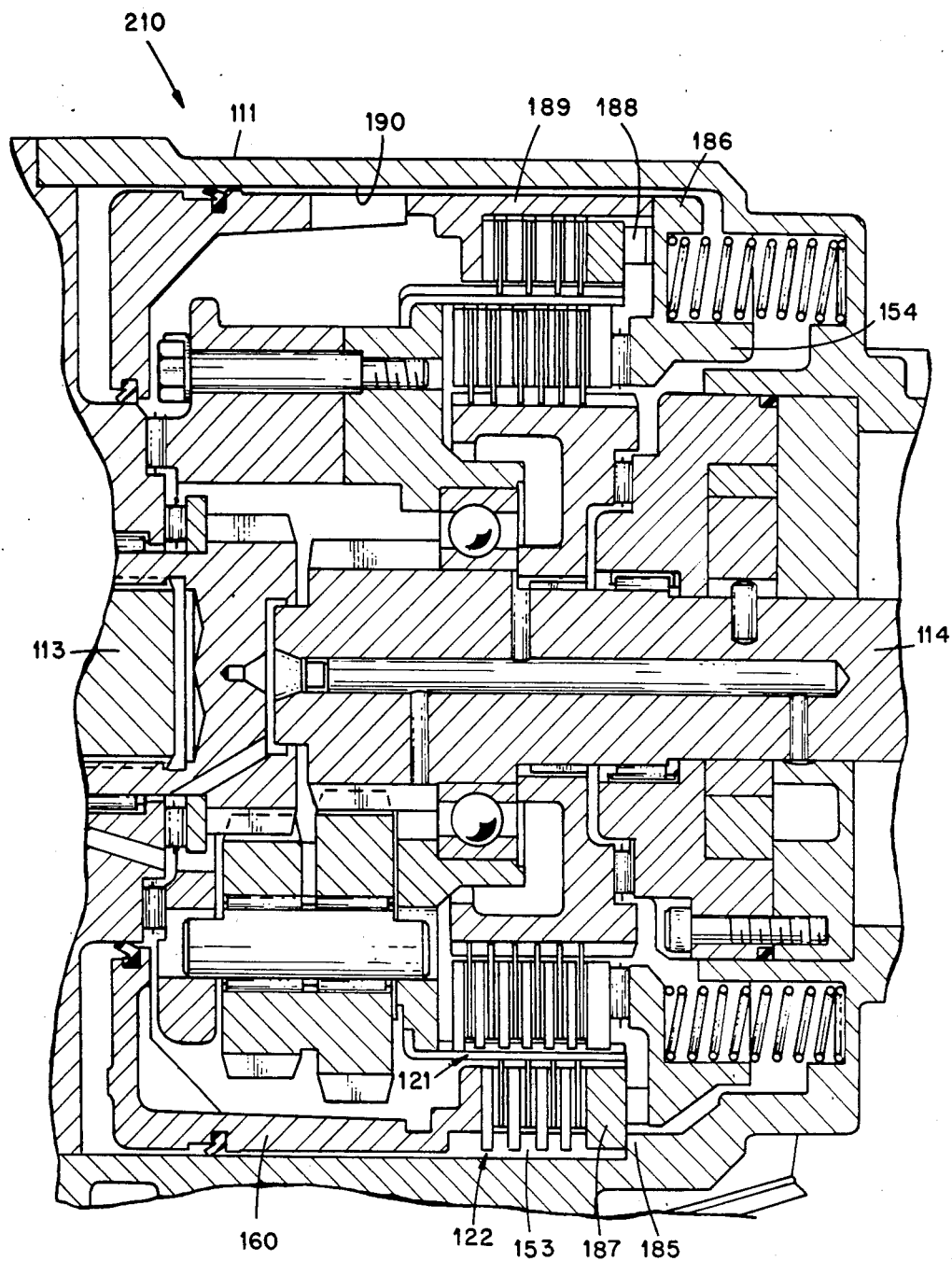
FIG. 14 is a cross-sectional side view of the overdrive transmission of FIG. 12 modified to provide a partially neutral feature, and showing the transmission in an overdrive mode.

The modification to the transmission 110 can best be seen by reference to FIG. 14. The housing 111 is provided with stop means, such as a shoulder 185 adjacent the second or overdrive clutch 122 on the opposite side thereof from the hydraulic piston 160. The shoulder 185 is not an annular shoulder, but is only formed in the housing selected intervals around the periphery of the second clutch 122. The clutch pressure plate 154 is modified by eliminating the outer or second clutch plate contact surface 159, and adding radial extending lips 186 at selected peripheral locations to the clutch pressure plate 154. An annularly shaped second clutch stop plate 187 is incorporated into the second clutch 122 on the opposite side of the second clutch from the hydraulic piston 160 between the second clutch and the shoulder stop 185. The annular stop plate 187 is externally splined and mates with the internal splines 153 formed in the housing 111 fixing the stop plate 187 against rotation and providing for movement relative to the housing along the splines 153 in the direction of, or along the longitudinal axis of the driven shaft 114. The biasing spring 161 which forces the piston 160 away from the second clutch 122 of the transmission 110 of FIG. 12 is removed and replaced by a spring 188 located between the radial lips 186 and the clutch pressure plate 154. The spring 188 is, for example, an annularly shaped wave-type spring and is in constant compression between the clutch stop plate and the pressure plate 154. The hydraulic piston 160 further includes a number of fingers 189 extending past the second clutch 122 in appropriate channels 190 formed in the housing 111 toward the radial lips 186 of the pressure plate 154. The number of fingers 189 is equal to the number of radial lips 186 of the pressure plate 154 and are aligned therewith so that the ends of the fingers 189 will contact the radial lips 186.

Figure 15:
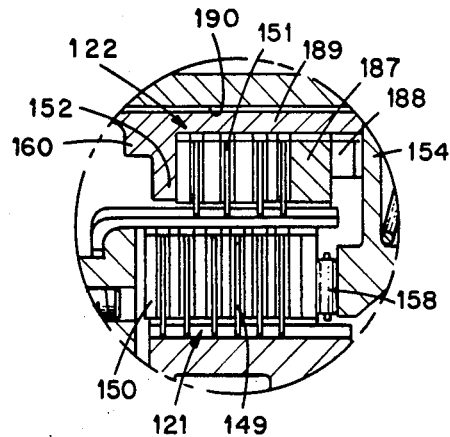
FIG. 15 is an enlarged view of a portion of FIG. 14 showing the transmission in a partially neutral mode.
Figure 16:
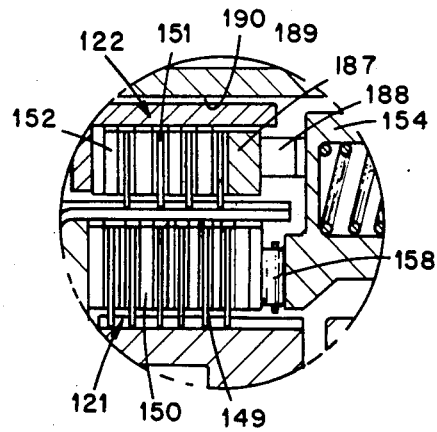
FIG. 16 is an enlarged view of a portion of FIG. 14 showing the transmission in a direct drive mode.

In operation, and as can be best visualized by reference to FIGS. 14, 15 and 16, which sequentially illustrates the overdrive transmission in the overdrive, partially neutral, and direct drive modes, respectively, when the overdrive transmission 110 is shifted into the overdrive mode, as discussed hereinabove, the hydraulic piston 160 moves toward the second clutch 122, and the fingers 189 contact and push the pressure plate 154 away from the second clutch 122 against the biasing force of the compression springs 155. When the pressure plate 154 moves away from the second clutch 122 it also, of course, moves away from the first clutch 121 displacing the inner contact surface 158 of the pressure plate 154 from the first clutch so that there is no axial force on the clutch plates 149 and discs 150 of the first clutch, thus, immediately disengaging the first clutch 121. Simultaneously, as the pressure plate 154 moves away from the second clutch 122 the wave spring 188 is further compressed continually increasing the force generated between the clutch stop plate 187 and pressure plate 154 which causes the clutch plates 151 and discs 152 to gradually move together into increasing mutual frictional contact. When the clutch stop plate 187 is forced against the shoulder stop 185, the second clutch 122 is totally engaged and the transmission 110 is in the overdrive mode.

With continued reference to FIGS. 14, 15 and 16, when the overdrive transmission 110 is shifted into the direct drive mode from the overdrive mode, as discussed hereinabove, the hydraulic piston 160 moves away from the second clutch 122 and the fingers 189 move out of contact with pressure plate 154 allowing the pressure plate 154 to move toward the first clutch 121 and the second clutch 122 under the biasing force of the springs 155. As the piston 160 moves away from the second clutch 122, the biasing force generated by the wave spring 188 gradually decreases, thus, gradually decreasing the force against the clutch plates 151 and discs 152 to gradually allow them to separate gradually decreasing the mutual frictional contact therebetween. The inner contact surface 158 of the pressure plate 154 contacts the first clutch 121 forcing the clutch plates 149 and discs 150 into mutual frictional engagement immediately engaging the first clutch 121 when the piston 160 has reached the end of its travel away from the second clutch 122 and the second clutch is completely disengaged.

It is also foreseeable that in other instances it would be desirable that during a shifting event of the overdrive transmission between the direct drive mode and the overdrive mode that both the first or direct drive clutch and second or overdrive clutch be simultaneously and momentarily disengaged. By way of abbreviation, this momentary disengagement of both the direct drive clutch and overdrive clutch during a shifting event can be referred to as a full neutral mode.

This full neutral mode can be incorporated in any of the embodiments of the overdrive transmission 10, 110 or 210 discussed above. However, for the sake of brevity, the incorporation of the full neutral feature will hereinafter be described in regard to the embodiment of the overdrive transmission 110 of FIG. 12.

Figure 17:
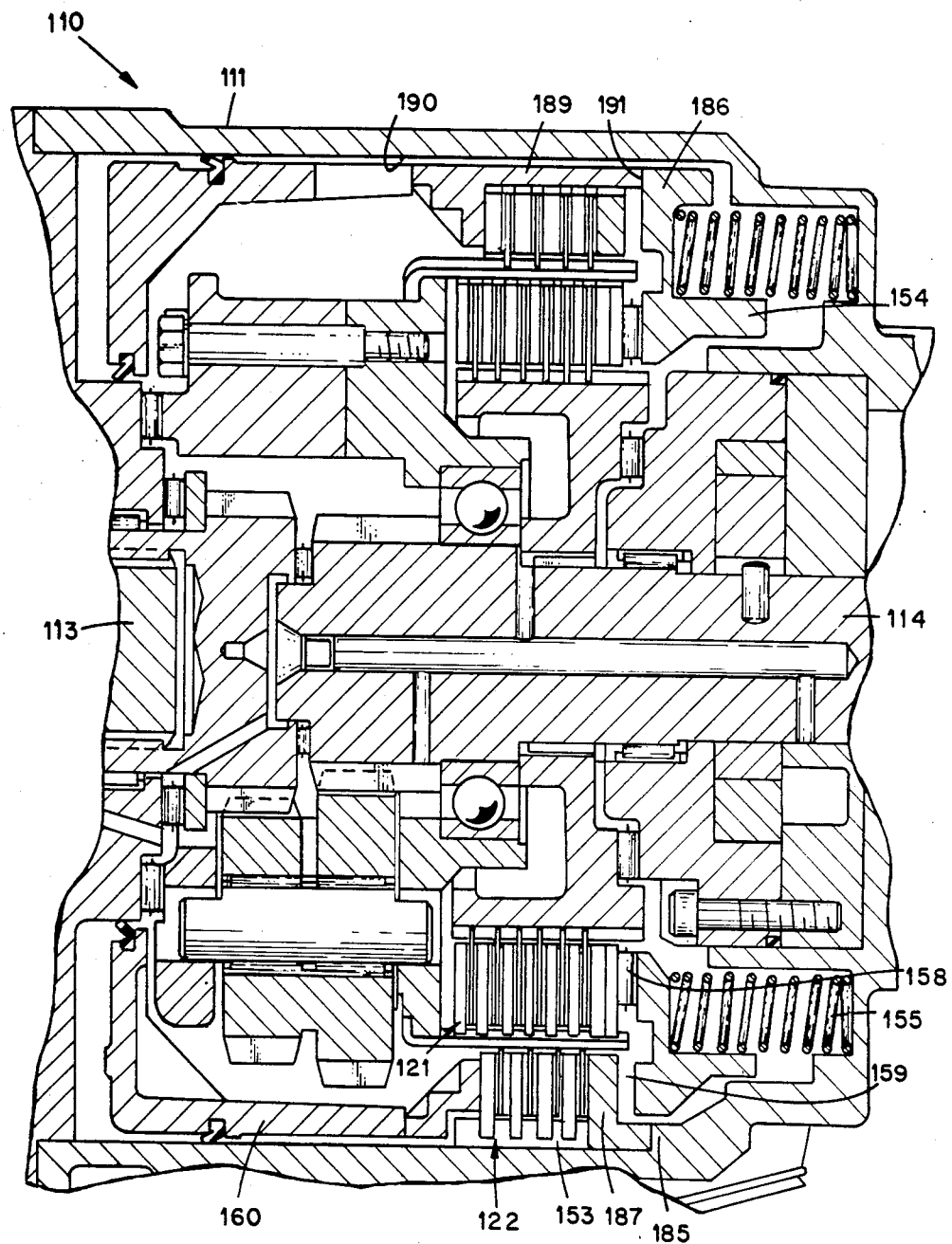
FIG. 17 is a cross-sectional side view of the overdrive transmission of FIG. 12 modified to provide a full neutral feature, and showing the transmission in the overdrive mode.

The modification to the transmission 110 can best be seen by reference to FIG. 17. The housing 111 is provided with stop means, such as the stop shoulder 185 adjacent the second or overdrive clutch 122 on the opposite side thereof from the hydraulic piston 160. The stop shoulder 185 is not an annular shoulder, but is only formed in the housing at intervals around the periphery of the second clutch 122. The clutch plate 154 is modified by including the radially extending lips 186 at selected peripheral locations around the pressure plate 154. The surface 191 of the lips facing toward the second clutch 122 are coplanar with the inner contact surface 158 of the pressure plate 154. The annularly shaped second clutch stop plate 187 is incorporated into the second clutch 122 on the opposite side of the second clutch from the hydraulic piston 160 between the second clutch and the shoulder stop 185. The annular stop plate 187 is externally splined and mates with the internal splines 153 formed in the housing 111 fixing the stop plate against rotation while providing for movement relative to the housing along the splines 153 in the direction of or along the longitudinal axis of the driven shaft 114. The biasing spring 161 which forces the piston 160 away from the second clutch 122 of the transmission 110 of FIG. 12 is removed, however, it should be noted that the wave spring 188 used in the transmission of FIGS. 14–17 is not used here. The hydraulic piston 160 is modified with a number of the fingers 189 extending past the second clutch 122 in appropriate channels 190 formed in the housing 111 toward the radial lips 186 of the pressure plate 154. The number of fingers 189 is equal to the number of radial lips 186 of the pressure plate 154 and are aligned therewith so that the ends of the fingers 189 will contact the surface 191 of the radial lips 186.

Figure 18:
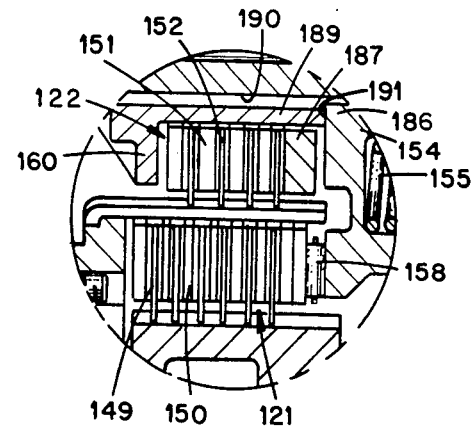
FIG. 18 is an enlarged view of a portion of FIG. 17 showing the transmission in a full neutral mode; and, FIG. 19 is an enlarged view of a portion of FIG. 17 showing the transmission in a direct drive mode.
Figure 19:
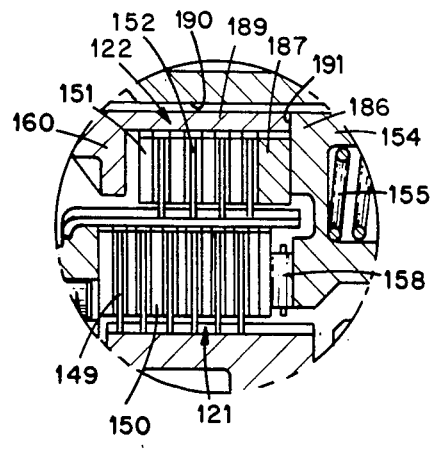

The following description of the operation of the overdrive transmission will be best understood by reference to FIGS. 17, 18 and 19 which sequentially illustrate the transmission in the overdrive mode, full neutral mode and direct drive mode.

As the overdrive transmission 110 is shifted into the overdrive mode, as discussed above in regard to the transmission 110 shown in FIG. 12, the hydraulic piston 160 moves toward the second clutch 122, and the ends of the fingers 189 contact the lips 186 and push the pressure plate 154 away from the second clutch 122 and first clutch 121 against the biasing force of the compression springs 155. As the pressure plate 154 moves, the inner contact surface 158 of the pressure plate is displaced from the first clutch 121 and there is no axial force on the clutch plates 149 and discs 150 which would otherwise force them into mutual frictional contact, and the first clutch is disengaged. Concurrently, as the piston 160 begins to move toward the second clutch 122 there is no axial force on the clutch plates 151 and discs 152 which would otherwise force them into mutual frictional contact, and the second clutch 122 is also disengaged. As the piston 160 continues to move toward the second clutch 122, it moves the clutch plates 151, clutch discs 152 and stop plate 187 along the splines 153 of the housing toward the stop shoulder 185 until the stop plate 187 contact the stop shoulder 185 compressively sandwiching the clutch plates 151 and discs 152 between the piston 160 and stop plate 187 forcing them into mutual frictional contact, and the second clutch 122 is engaged.

As the overdrive transmission 110 is shifted from the overdrive mode to the direct drive mode, as discussed above in regard to the embodiment of FIG. 12, the biasing force of the springs 155 moves the pressure plate 14 toward the first clutch and second clutch. The radial lips 186 of the pressure plate 154 pushes against the fingers 189 of the piston 160 and, thus, moves the piston 160 away from the second clutch 122. As the piston 160 begins to move away from the second clutch 122, the axial force on pushing the clutch plates 151 and discs 152 into mutual frictional contact is relieved and the second clutch 122 is disengaged. At this point, the pressure plate 154 has not moved toward the first clutch 121 far enough to force the inner contact surface 158 of the pressure plate 154 into contact with the first clutch 121 and, therefore, the first clutch 121 is also disengaged. The pressure plate 154 continues to move toward the first clutch 121 the inner contact surface 158 contacts the first clutch 121 and forces the clutch plates 149 and discs 150 into mutual frictional contact, and the first clutch 121 is engaged.

The overdrive transmission of the present invention in all its various advantageous embodiments is very compact in size, rugged, and well suited for use as original equipment or as an after-market retrofit to a motor vehicle.

The foregoing detailed description is given primarily for clearness of understanding and no unnecessary limitations should be understood therefrom for modifications will be obvious to those skilled in the art upon reading this disclosure and can be made without departing from the spirit of the invention or the scope of the claims.

What is claimed:

1. A clutch and brake apparatus for being mounted in a housing comprising:

a first clutch means having an annular shape;

a second clutch means functioning as a brake adjacent the first clutch means, said second clutch means having an annular shape and being concentrically disposed with said first clutch means;

a clutch pressure plate;

means for mounting said pressure plate for non-rotating movement toward and away from said first clutch means and said second clutch means for selectively engaging at least one of said first and second clutch means and for holding said pressure plate in a rotationally stationary position with respect to said housing and second clutch means;

means for urging said clutch pressure plate toward both said first clutch means and said second clutch means, said urging means of said clutch pressure plate being operable to engage said first clutch means;

rolling means interposed between said first clutch means and said pressure plate means to permit relative movement between said pressure plate means and said first clutch means; and said first clutch means being operable to rotate relative to said pressure plate means when force is applied by said pressure plate means through said roller means; and piston means for moving toward said second clutch means to selectively compress and engage said second clutch means and to selectively move said pressure plate away from said first clutch means to disengage said first clutch means.

2. The clutch apparatus of claim 1, further comprising means providing a full neutral mode wherein both said first clutch means and said second clutch means momentarily and simultaneously disengage as one or the other of said first and second clutch means is being engaged.

3. The clutch apparatus of claim 1, further comprising means providing a partially neutral mode wherein:

said first clutch means completely disengages as said second clutch means engages; and, said first clutch means completely engages after said second clutch means has gradually disengaged.

* * * * *

UNITED STATES PATENT AND TRADEMARK OFFICE
CERTIFICATE OF CORRECTION

PATENT NO. : 4,688,664
DATED : August 25, 1987
INVENTOR(S) : George F. Miller

It is certified that error appears in the above-identified patent and that said Letters Patent is hereby corrected as shown below: On the Title Page:

In the Abstract, after "comprises" insert -- a -- on line 2.

In the Abstract, after "and" insert -- a -- on line 3.

In the Abstract, delete "with" and insert -- in relation to -- on line 5.

In the Abstract, line 9, delete "holding the pressure plate" and insert -- being held --.

In column 6, line 26, after "42" insert -- of --.

In column 14, line 55, "drive" should be -- driven --.

In column 21, line 44, "241" should be -- 214 --.

In column 22, line 66, "24" should be -- 254 --.

In column 24, line 9, after "housing" insert -- at --.

In column 26, line 36, "14" should be --154 --.

Signed and Sealed this

Twenty-second Day of March, 1988

Attest:

DONALD J. QUIGG

*Attesting Officer*     *Commissioner of Patents and Trademarks*